United States Patent
Lee et al.

(10) Patent No.: US 12,022,528 B2
(45) Date of Patent: Jun. 25, 2024

(54) METHOD OF PERFORMING RANDOM ACCESS PROCEDURE, AND TRANSMITTING DEVICE, APPARATUS AND STORAGE MEDIUM THEREFOR

(71) Applicant: LG ELECTRONICS INC., Seoul (KR)

(72) Inventors: Eunjong Lee, Seoul (KR); Hyunsoo Ko, Seoul (KR); Jeonggu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 394 days.

(21) Appl. No.: 17/310,723

(22) PCT Filed: Mar. 5, 2020

(86) PCT No.: PCT/KR2020/095021
§ 371 (c)(1),
(2) Date: Aug. 19, 2021

(87) PCT Pub. No.: WO2020/180172
PCT Pub. Date: Sep. 10, 2020

(65) Prior Publication Data
US 2022/0141884 A1    May 5, 2022

(30) Foreign Application Priority Data
Mar. 5, 2019 (KR) .................. 10-2019-0025042

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01);
(Continued)

(58) Field of Classification Search
CPC ......... H04W 72/0446; H04W 72/0453; H04W 72/23; H04W 74/0833; H04W 74/0841; H04W 74/0866; H04W 80/02
See application file for complete search history.

(56) References Cited

U.S. PATENT DOCUMENTS

2011/0170503 A1* 7/2011 Chun .................. H04W 74/006
                                                                370/329
2016/0198497 A1* 7/2016 Yu ..................... H04W 72/0446
                                                                370/330
(Continued)

FOREIGN PATENT DOCUMENTS

KR    1020180116233    10/2018

OTHER PUBLICATIONS

PCT International Application No. PCT/KR2020/095021, International Search Report dated Jun. 23, 2020, 9 pages.
(Continued)

*Primary Examiner* — Kashif Siddiqui
(74) *Attorney, Agent, or Firm* — LEE, HONG, DEGERMAN, KANG & WAIMEY

(57) ABSTRACT

In the present disclosure, a transmitting device transmits a first message comprising i) a first random access preamble with a first random access preamble identifier (RAPID) and ii) a first uplink payload; receives a random access response (RAR) medium access control (MAC) protocol data unit (PDU) including i) a first field set to represent presence of one or more RAPIDs and ii) the one or more RAPIDs; determines whether both of the first RAP and the first payload is successfully transmitted, based on whether the one or more RAPIDs include the first RAPID; and monitors a second message related to the first message based on determining that both of the first RAP and the first payload is successfully transmitted.

14 Claims, 16 Drawing Sheets

(51) Int. Cl.
*H04W 72/0453* (2023.01)
*H04W 72/23* (2023.01)
*H04W 74/08* (2009.01)
*H04W 80/02* (2009.01)

(52) U.S. Cl.
CPC ....... *H04W 72/23* (2023.01); *H04W 74/0866* (2013.01); *H04W 80/02* (2013.01)

(56) References Cited

U.S. PATENT DOCUMENTS

| | | |
|---|---|---|
| 2017/0367120 A1 | 12/2017 | Murray et al. |
| 2018/0077729 A1* | 3/2018 | Lee .................. H04W 74/0833 |
| 2018/0279375 A1 | 9/2018 | Jeon et al. |
| 2018/0359784 A1* | 12/2018 | Agiwal ................ H04L 5/0044 |
| 2020/0037394 A1* | 1/2020 | Ohama ................ H04W 88/10 |
| 2020/0178308 A1* | 6/2020 | Chen .................... H04L 69/22 |
| 2022/0015152 A1* | 1/2022 | Chen ................ H04W 74/0833 |

OTHER PUBLICATIONS

ZTE et al., "Considerations on 2-Step RACH Procedures," 3GPP TSG RAN WG1 Meeting #96, R1-1901627, Feb.-Mar. 2019, 11 pages.
Brd Generation Partnership Project (3GPP), "Technical Specification Group Radio Access Network; NR: Medium Access Control (MAC) protocol specification (Release 15)," 3GPP TS 38.321 V15.4.0, Feb. 2018, 77 pages.

\* cited by examiner (a) User Plane Protocol Stack (b) Control Plane Protocol Stack (a)

(b)

(a)

(b)

(a)  (b)

(a)  (b)

METHOD OF PERFORMING RANDOM ACCESS PROCEDURE, AND TRANSMITTING DEVICE, APPARATUS AND STORAGE MEDIUM THEREFOR

TECHNICAL FIELD

The present invention relates to a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information.

DISCLOSURE

Technical Problem

Various types of signals, including data signals and control signals, are communicated via the UL and DL. Scheduling of such communications is typically performed, to achieve improved efficiency, latency, and/or reliability. Overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

Technical Solution

As an aspect of the present disclosure, provided herein is a method for performing a random access procedure by a transmitting device in a wireless communication system. The method comprises: transmitting a first message comprising i) a first random access preamble (RAP) with a first random access preamble identifier (RAPID) and ii) a first uplink payload; receiving a random access response (RAR) medium access control (MAC) protocol data unit (PDU) including i) a first field set to represent presence of one or more RAPIDs and ii) the one or more RAPIDs; determining whether both of the first RAP and the first payload is successfully transmitted, based on whether the one or more RAPIDs include the first RAPID; and monitoring a second message related to the first message based on determining that both of the first RAP and the first payload is successfully transmitted.

As another aspect of the present disclosure, provided herein is a transmitting device of performing a random access procedure by a transmitting device in a wireless communication system. The transmitting device comprises: at least one transceiver; at least one processor; and at least one computer memory storing instructions which, when executed, cause the at least one processor to perform operations. The operations comprise: transmitting a first message comprising i) a first random access preamble (RAP) with a first random access preamble identifier (RAPID) and ii) a first uplink payload; receiving a random access response (RAR) medium access control (MAC) protocol data unit (PDU) including i) a first field set to represent presence of one or more RAPIDs and ii) the one or more RAPIDs; determining whether both of the first RAP and the first payload is successfully transmitted, based on whether the one or more RAPIDs include the first RAPID; and monitoring a second message related to the first message based on determining that both of the first RAP and the first payload is successfully transmitted.

As a further aspect of the present disclosure, provided herein is an apparatus for a transmitting device. The apparatus comprises: at least one processor; and at least one computer memory storing instructions which, when executed, cause the at least one processor to perform operations. The operations comprise: transmitting a first message comprising i) a first random access preamble (RAP) with a first random access preamble identifier (RAPID) and ii) a first uplink payload; receiving a random access response (RAR) medium access control (MAC) protocol data unit (PDU) including i) a first field set to represent presence of one or more RAPIDs and ii) the one or more RAPIDs; determining whether both of the first RAP and the first payload is successfully transmitted, based on whether the one or more RAPIDs include the first RAPID; and monitoring a second message related to the first message based on determining that both of the first RAP and the first payload is successfully transmitted.

As a still further aspect of the present disclosure, provided herein is a computer readable storage medium storing at least one program that include instructions which, when executed, cause the at least one processor to perform operations. The operations comprise: transmitting a first message comprising i) a first random access preamble (RAP) with a first random access preamble identifier (RAPID) and ii) a first uplink payload; receiving a random access response (RAR) medium access control (MAC) protocol data unit (PDU) including i) a first field set to represent presence of one or more RAPIDs and ii) the one or more RAPIDs; determining whether both of the first RAP and the first payload is successfully transmitted, based on whether the one or more RAPIDs include the first RAPID; and monitoring a second message related to the first message based on determining that both of the first RAP and the first payload is successfully transmitted.

In each aspect of the present disclosure, the first field may represent presence or absence of the one or more RAPIDs. Each of the one or more RAPIDs may represent that a corresponding RAP and a payload transmitted with the corresponding RAP are both transmitted successfully.

In each aspect of the present disclosure, the method or the operations may further comprise: retrying the random access procedure based on determining that at least one of the first RAP and the first payload is not successfully transmitted. The method or the operations may further comprise: determining that at least one of the first RAP and the first payload is not successfully transmitted, based on the one or more RAPIDs not including the first RAPID.

In each aspect of the present disclosure, the RAR MAC PDU may include a length field representing the number of RAPIDs related to the first field.

In each aspect of the present disclosure, the RAR MAC PDU may include a second field. The second field may represent whether the second field is followed by the first field. The second field may represent whether the second field is followed by the first field or followed by an RAPID

FIELD

The above technical solutions are merely some parts of the implementations of the present disclosure and various implementations into which the technical features of the present disclosure are incorporated can be derived and understood by persons skilled in the art from the following detailed description of the present disclosure.

Advantageous Effects

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
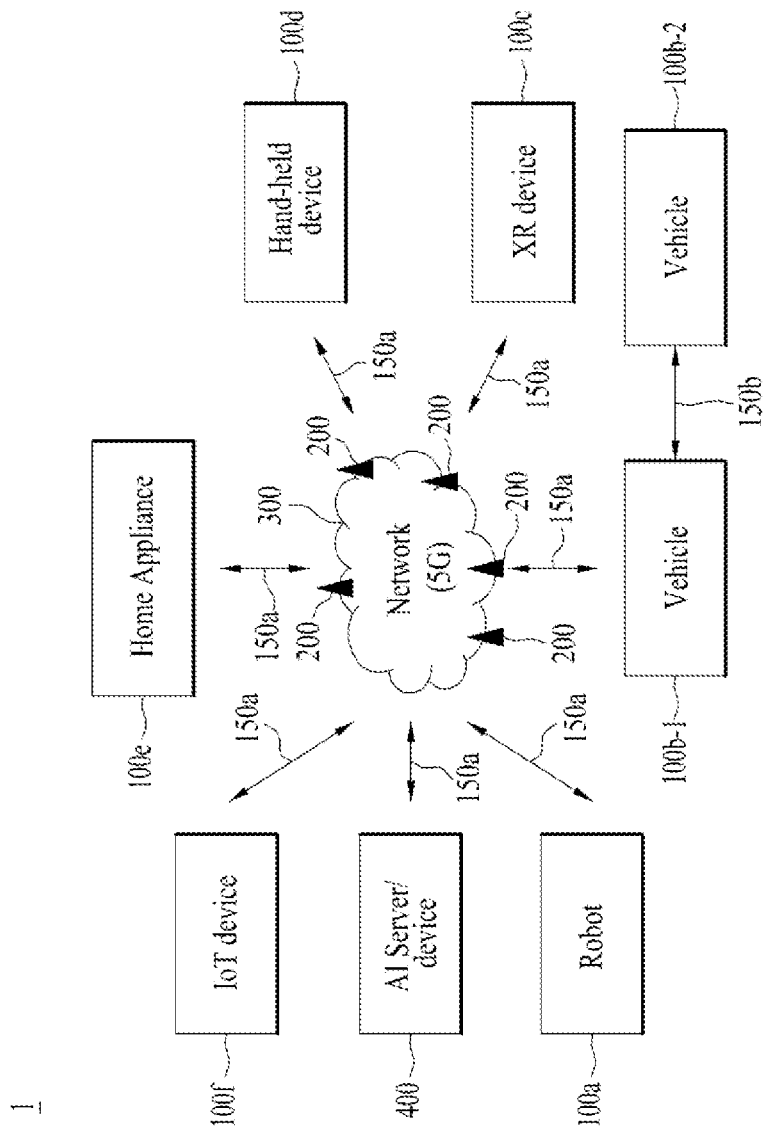
FIG. 1 illustrates an example of a communication system 1 to which implementations of the present disclosure is applied.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). In the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the enhanced packet core (EPC)/long term evolution (LTE) system is referred to as an eNB, and a BS of the new radio (NR) system is referred to as a gNB.

In the present disclosure, a node refers to a point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In the present disclosure, a physical downlink control channel (PDCCH), and a physical downlink shared channel (PDSCH) refer to a set of time-frequency resources or resource elements (REs) carrying downlink control information (DCI), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. In the present disclosure, for dual connectivity (DC) operation, the term "special Cell" refers to the PCell of the master cell group (MCG) or the PSCell of the secondary cell group (SCG), and otherwise the term Special Cell refers to the PCell. An SpCell supports physical uplink control channel (PUCCH) transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with DC. For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells.

The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In DC, two MAC entities are configured in the UE: one for the MCG and one for the SCG. Each MAC entity is configured by RRC with a serving cell supporting PUCCH transmission and contention based Random Access. In the present disclosure, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, monitoring a channel refers to attempting to decode the channel. For example, monitoring a physical downlink control channel (PDCCH) refers to attempting to decode PDCCH(s) (or PDCCH candidates).

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200*a* may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
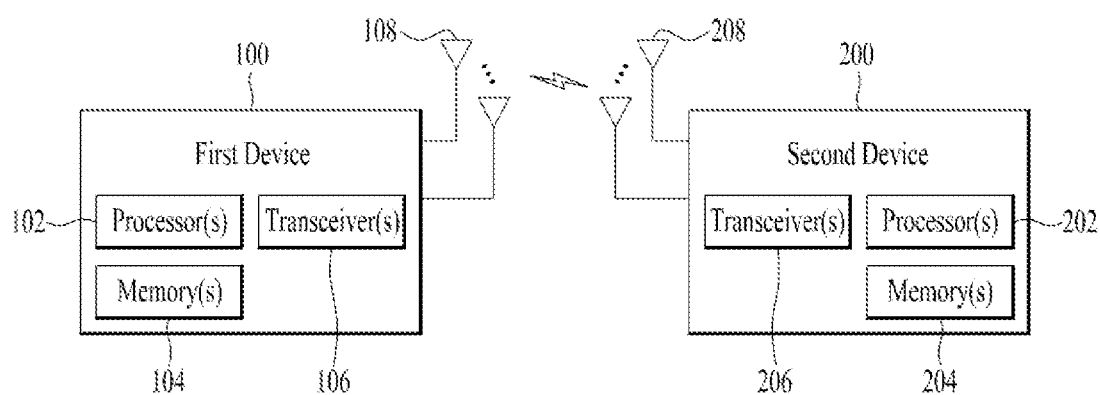
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the present disclosure, at least one memory (e.g. 104 or 204) may store instructions or programs that, when executed, cause at least one processor, which is operably connected thereto, to perform operations according to some embodiments or implementations of the present disclosure.

In the present disclosure, a computer readable storage medium may store at least one instruction or computer program that, when executed by at least one processor, causes the at least one processor to perform operations according to some embodiments or implementations of the present disclosure.

In the present disclosure, a processing device or apparatus may comprise at least one processor, and at least one computer memory connectable to the at least one processor and storing instructions that, when executed, cause the at least one processor to perform operations according to some embodiments or implementations of the present disclosure.

In some implementations of the present disclosure, a UE may operate as a transmitting device in uplink (UL) and as a receiving device in downlink (DL). In some implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS, unless otherwise mentioned or described. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

Figure 3:
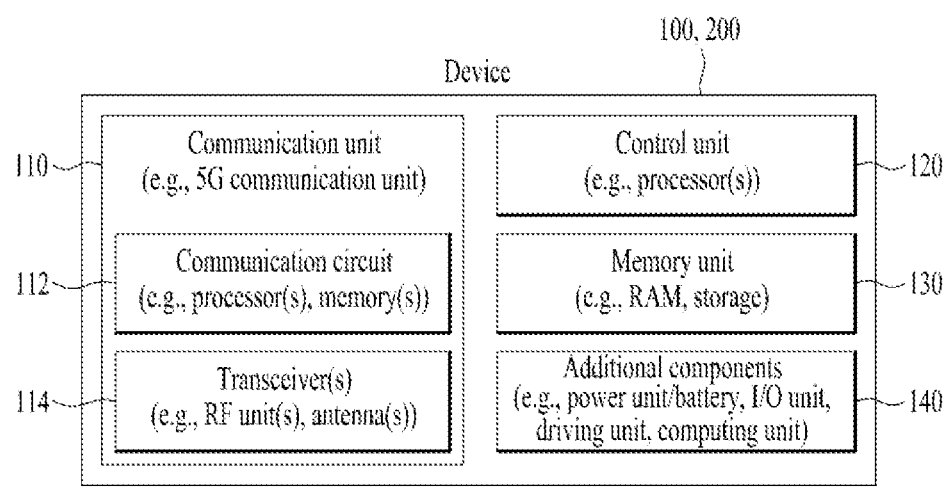
FIG. 3 illustrates another example of a wireless device which can perform implementations of the present invention.

FIG. 3 illustrates another example of a wireless device which can perform implementations of the present invention. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 4:
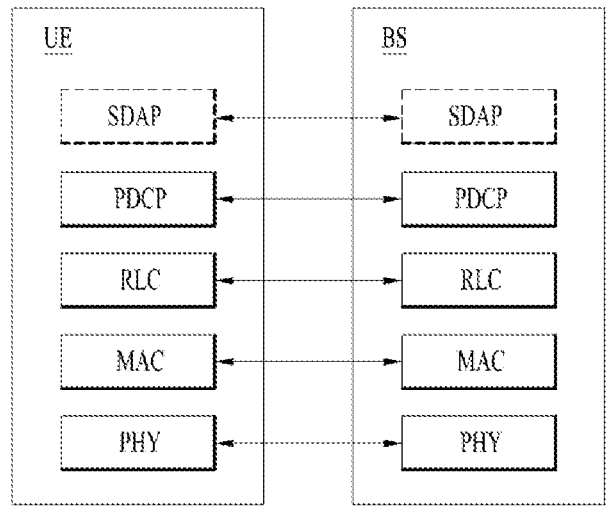
FIG. 4 illustrates an example of protocol stacks in a third generation partnership project (3GPP) based wireless communication system.
Figure 4:
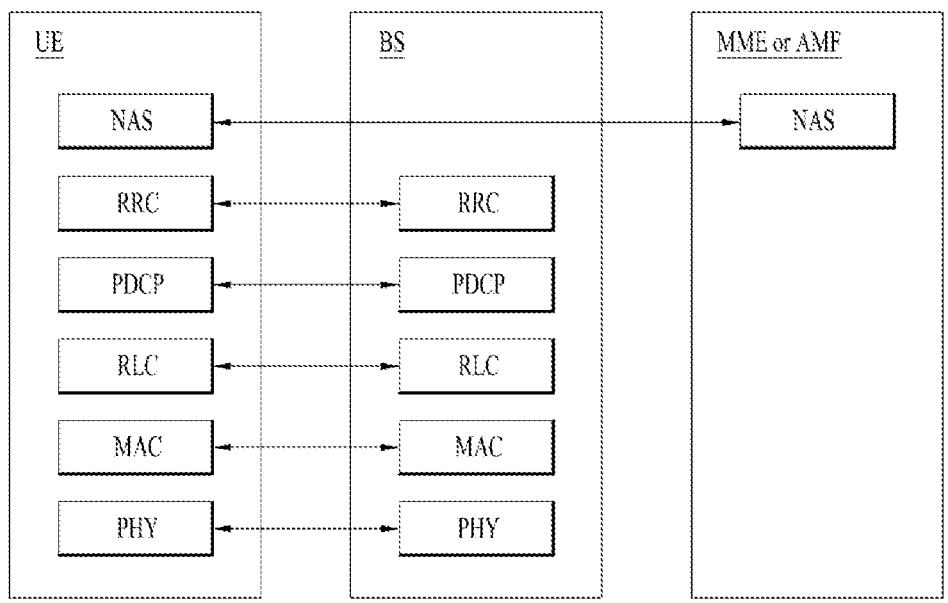

FIG. 4 illustrates an example of protocol stacks in a 3GPP based wireless communication system.

In particular, FIG. 4(*a*) illustrates an example of a radio interface user plane protocol stack between a UE and a base station (BS) and FIG. 4(*b*) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(*a*), the user plane protocol stack may be divided into a first layer (Layer 1) (i.e., a physical (PHY) layer) and a second layer (Layer 2). Referring to FIG. 4(*b*), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

The NAS control protocol is terminated in an access management function (AMF) on the network side, and performs functions such as authentication, mobility management, security control and etc.

In the 3GPP LTE system, the layer 2 is split into the following sublayers: medium access control (MAC), radio link control (RLC), and packet data convergence protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network quality of service (QoS) flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G core (5GC) or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
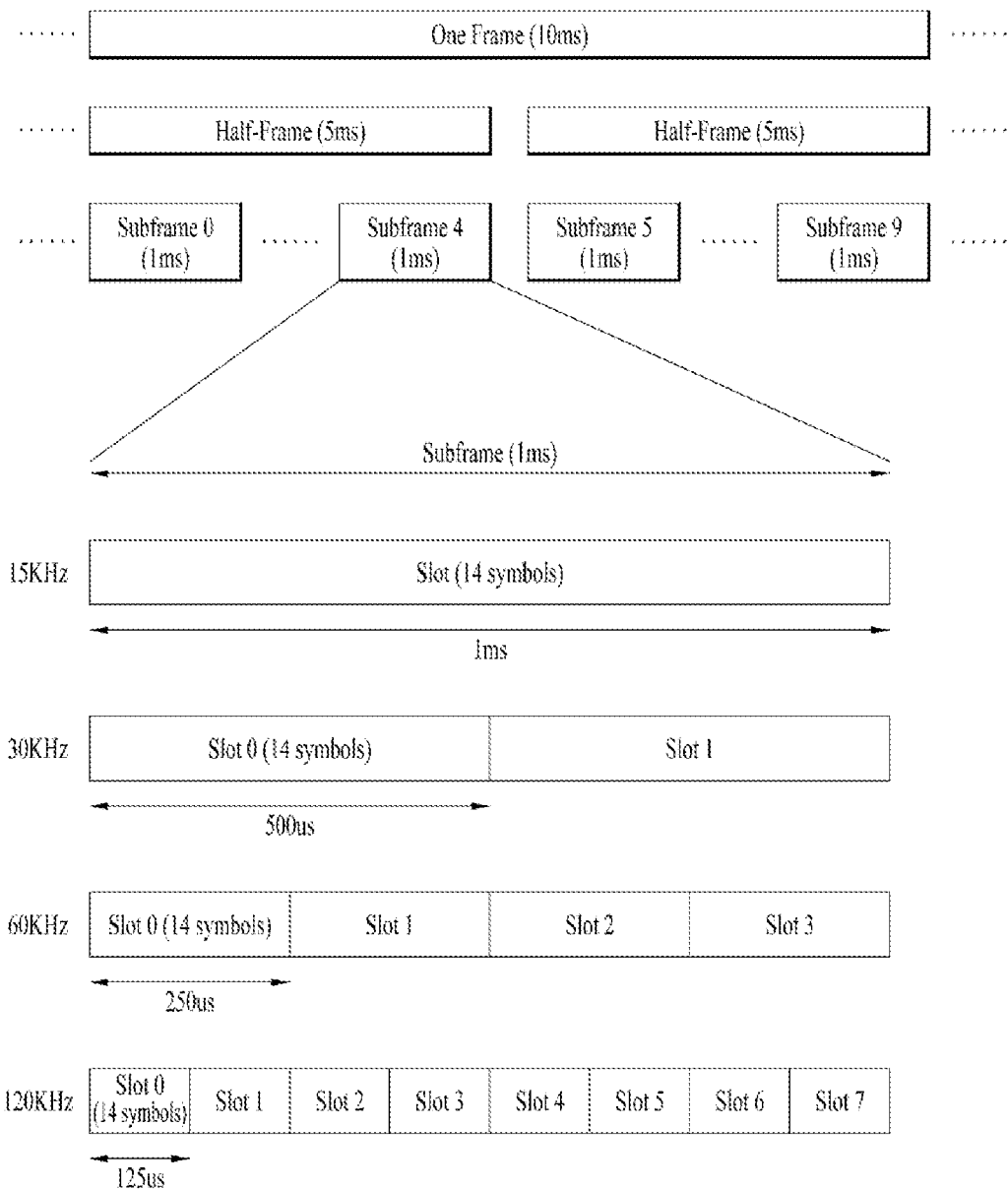
FIG. 5 illustrates an example of a frame structure in a 3GPP based wireless communication system.

FIG. 5 illustrates an example of a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz. The following table shows the number of OFDM symbols per slot, the number of slots per frame, and the number of slots per for the normal CP, according to the subcarrier spacing $\Delta f=2^u*15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing of =2u*15 kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subrrame,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks in the resource grid and the subscript x is DL for downlink and UL for uplink. $N^{RB}_{sc}$ is the number of subcarriers per resource blocks. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, a resource block is defined by 12 consecutive subcarriers in the frequency domain.

In the 3GPP NR system, resource blocks are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive resource blocks. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

NR frequency bands are defined as 2 types of frequency range, FR1 and FR2. FR2 is may be also called millimeter wave (mmW). The frequency ranges in which NR can operate are identified as described in Table 3.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 6:
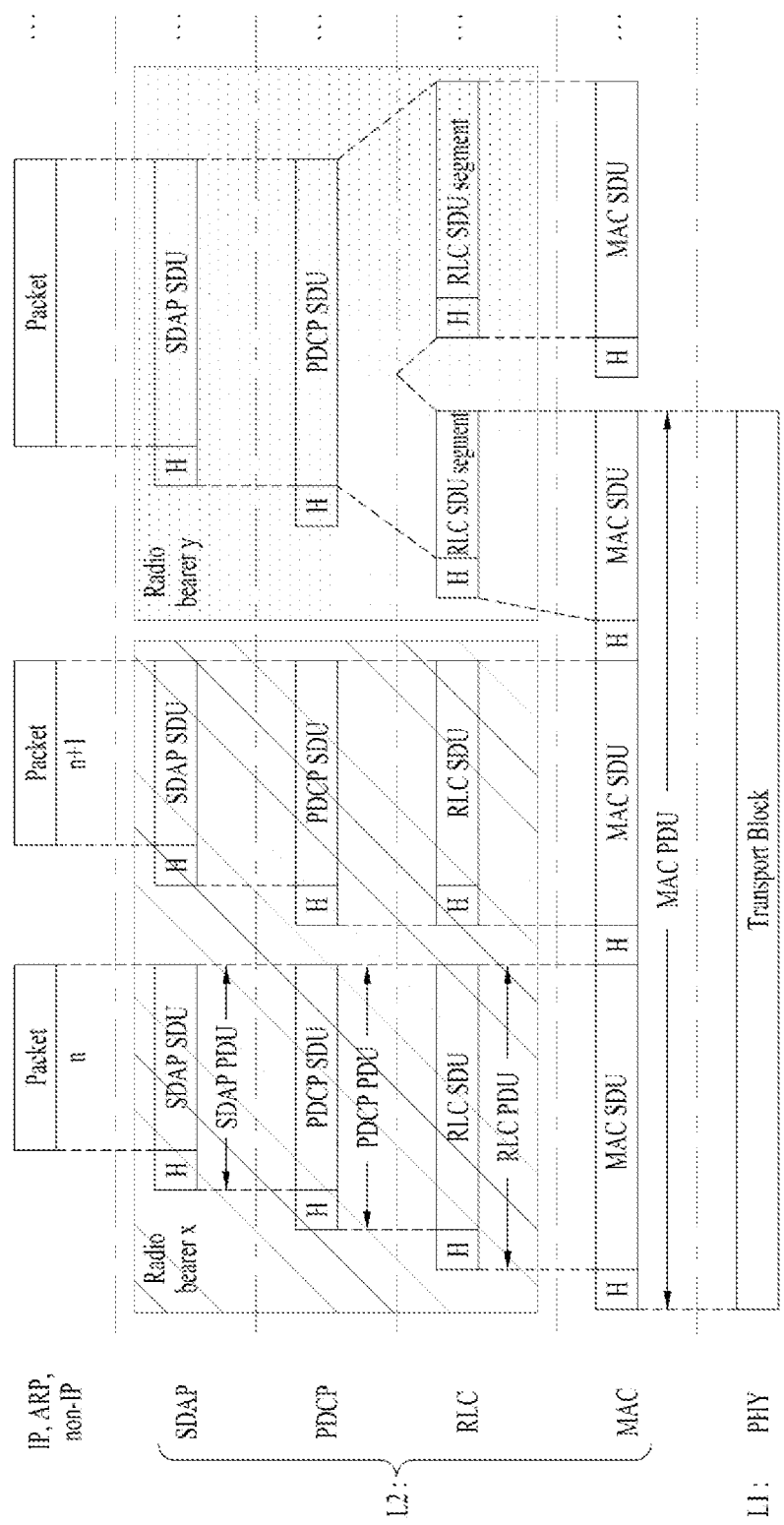
FIG. 6 illustrates a data flow example in the 3GPP new radio (NR) system.

FIG. 6 illustrates a data flow example in the 3GPP NR system.

In FIG. 6, "RB" denotes a radio bearer, and "H" denotes a header. Radio bearers are categorized into two groups: data radio bearers (DRB) for user plane data and signaling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to physical uplink shared channel (PUSCH) and physical random access channel (PRACH), respectively, and the downlink transport channels DL-SCH, BCH and PCH are mapped to physical downlink shared channel (PDSCH), physical broad cast channel (PBCH) and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

For UCI transmission/reception, the following PUCCH formats may be used.

TABLE 4

| PUCCH format | Length in OFDM symbols | Number of UCI bits |
|---|---|---|
| 0 | 1-2 | =<2 |
| 1 | 4-14 | =<2 |
| 2 | 1-2 | >2 |
| 3 | 4-14 | >2 |
| 4 | 4-14 | >2 |

PUCCH format 0 is a short PUCCH of 1 or 2 symbols with small UCI payloads of up to two bits. PUCCH format 1 is a long PUCCH of 4 to 14 symbols with small UCI payloads of up to 2 bits. PUCCH format 2 is a short PUCCH of 1 or 2 symbols with large UCI payloads of more than two bits with no UE multiplexing capability in the same PRBs. PUCCH format 3 is a long PUCCH of 4 to 14 symbols with large UCI payloads with no UE multiplexing capability in the same PRBs. PUCCH format 4 is a long PUCCH of 4 to 14 symbols with moderate UCI payloads with multiplexing capacity of up to 4 UEs in the same PRBs. For each PUCCH format, resource location is configured by RRC signalling. For example, IE PUCCH-Config is used to configure UE specific PUCCH parameters (per BWP).

An operation to be first performed by the UE to receive services in association with a wireless communication system includes acquiring time and frequency synchronization of the corresponding system, receiving basic system information (SI), and synchronizing uplink timing to an uplink. This procedure will be referred to as an initial access procedure. The initial access procedure generally includes a synchronization procedure and a random access procedure. In a 3GPP based communication system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from a BS to thus establish synchronization with the eNB and acquire information such as a cell identity (ID).

For example, the UE acquires OFDM symbol timing and slot timing based on PSS and SSS and also acquires cell ID, and acquires important information in the corresponding system by descrambling and decoding a PBCH using a cell ID. After completing the synchronization procedure, the UE performs a random access procedure. In other words, after the initial cell search procedure, the UE may perform a random access procedure to complete access to the BS. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

The random access procedure is classified into a contention-based procedure and a dedicated (that is, contention-free based) procedure. The contention-based random access (CBRA) procedure is generally used for initial access, and the contention-free random access (CFRA) procedure is restrictively used for handover. In the CBRA procedure, the UE randomly selects RACH preamble sequence. Therefore, a plurality of UEs may transmit the same random access preamble sequence, whereby a contention resolution procedure is required. On the other hand, in the CFRA procedure, the UE uses a random access preamble sequence uniquely allocated to a corresponding UE. Therefore, the UE may perform the random access procedure without contention with another UE.

Figure 7:
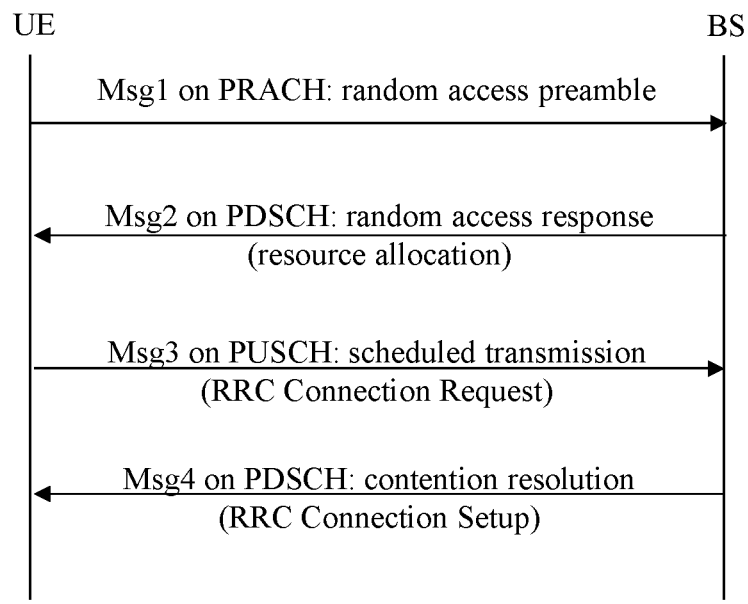
FIG. 7 and FIG. 8 illustrate examples of random access procedures in the 3GPP based system.
Figure 8:
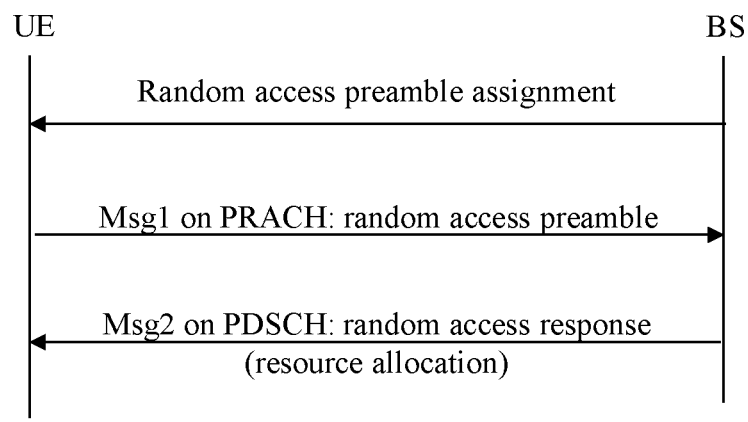

FIG. 7 and FIG. 8 illustrate examples of random access procedures in the 3GPP based system. In particular, FIG. 7 illustrates an example of a flow diagram of the CBRA procedure in the 3GPP based system, and FIG. 8 illustrates an example of a flow diagram of the CFRA procedure in the 3GPP based system.

Referring to FIG. 7, the CBRA procedure includes four steps as follows. Hereinafter, messages transmitted in the steps 1 to 4 may be referred to as 1 to 4 (Msg1 to Msg4):
  Step 1: random access preamble (via PRACH) (UE to BS);
  Step 2: random access response (RAR) (via PDCCH and PDSCH) (BS to UE);
  Step 3: layer 2/layer 3 message (via PUSCH) (UE to BS);
  Step 4: contention resolution message (BS to UE).

Referring to FIG. 8, the CFRA procedure includes three steps as follows. Hereinafter, messages transmitted in steps 0 to 2 may be referred to as messages 0 to 2 (Msg0 to Msg2). As a part of the random access procedure, uplink transmission (that is, step 3) corresponding to RAR may be performed. The dedicated random access procedure may be triggered using a PDCCH (hereinafter, PDCCH order) for commanding random access preamble transmission:
  Step 0: RACH preamble allocation (BS to UE) through dedicated signaling;
  Step 1: RACH preamble (via PRACH) (UE to BS); and
  Step 2: random access response (RAR) (via PDCCH and PDSCH) (BS to UE).

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information corresponding to Msg3.

The random access procedure illustrated in FIG. 7 and FIG. 8 involves at least four or three steps of signal transmissions/receptions between the BS and the UE before the random access procedure is completed successfully. It results in communication delay between the BS and the UE. Recently, 2-step random access procedure (hereinafter, 2-step RACH) is under discussion in order to reduce the communication delay. For the 2-step RACH, the messages in time order are named as MsgA and MsgB.

In some implementations of the present disclosure, the 2-step RACH may be designed based on the following assumption(s):
  Only CBRA procedure is specified for the 2-step RACH;
  The 2-step RACH shall be able to operate regardless of whether the UE has valid timing advance (TA) or not;
  The 2-step RACH is applicable to any cell size supported in the wireless communication system;
  The 2-step RACH is applied for RRC_INACTIVE, RRC_CONNECTED and RRC_IDLE;
  Channel structure of MsgA is i) preamble and ii) PUSCH carrying payload.
  The mapping between i) the PRACH preamble and ii) the time-frequency resource of PUSCH in MsgA (and DMRS);
  All triggers for the 4-step RACH (e.g. see the document 3GPP TS 38.321 V15.3.0, at section 5.4.4 'Scheduling Request', section 5.15 'Bandwidth Part (BWP) operation' and section 5.17 'Beam Failure Detection and Recovery procedure') may be applied for the 2-step RACH); and/or
  The fallback procedure from the 2-step RACH to the 4-step RACH may be designed.

Based on the following assumption(s), in some implementations of the present, the following 2-step RACH procedures may be considered.

Figure 9:
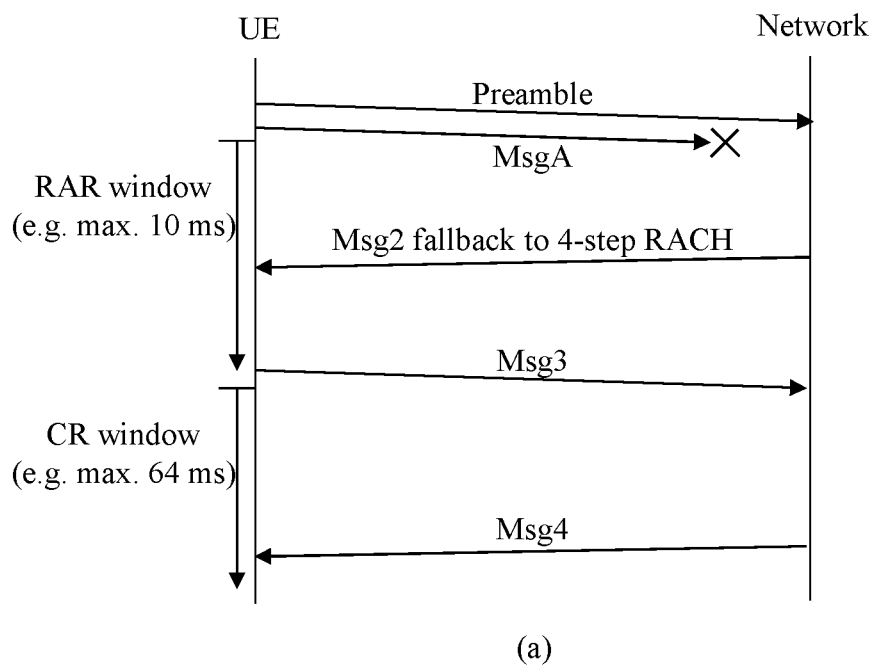
FIG. 9 illustrates examples of flow diagrams of the 2-step RACH procedure in some implementations of the present disclosure.
Figure 9:
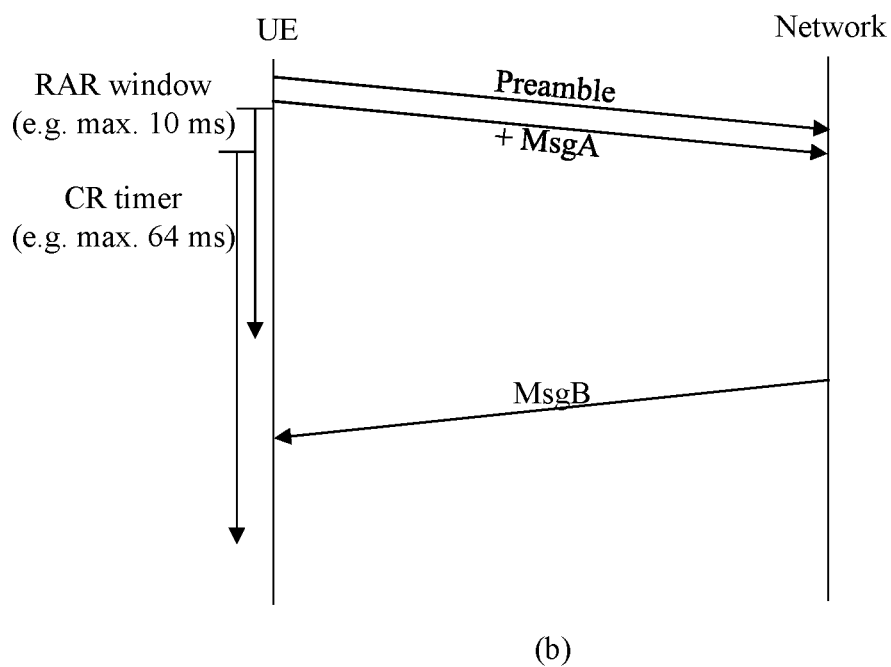

FIG. 9 illustrates examples of flow diagrams of the 2-step RACH procedure in some implementations of the present disclosure. In particular, FIG. 9 illustrates examples of the 2-step RACH procedure successfully completed. In more particular, FIG. 9(a) illustrates an example of a successfully completed 2-step RACH involving a fallback to the 4-step RACH, and FIG. 9(b) illustrates an example of a successfully completed 2-step RACH without a fallback to the 4-step RACH.

The UE transmits simultaneously or sequentially a preamble and a PUSCH carrying payload. The UE calculates RA-RNTI based on the transmitted preamble. The UE also calculates temporary C-RNTI (TC-RNTI) based on the transmitted PUSCH resource (and preamble).

The UE monitors PDCCH addressed by RA-RNTI during a RAR window (e.g. UE monitors PDCCH addressed by RA-RNTI while a timer related to the RAR window is running).

The UE may monitor PDCCH addressed by TC-RNTI (e.g., while contention resolution (CR) timer is running).

Referring to FIG. 9(a), if the UE receives a RAR message with the transmitted preamble ID during a RAR window (e.g. if the UE receives a RAR message with the transmitted preamble ID while a timer related to the RAR window is running), the UE may fall back to the 4-step RACH procedure. The RAR message contains at least one of timing advance (TA) value, TC-RNTI and UL grant.

Figure 10:
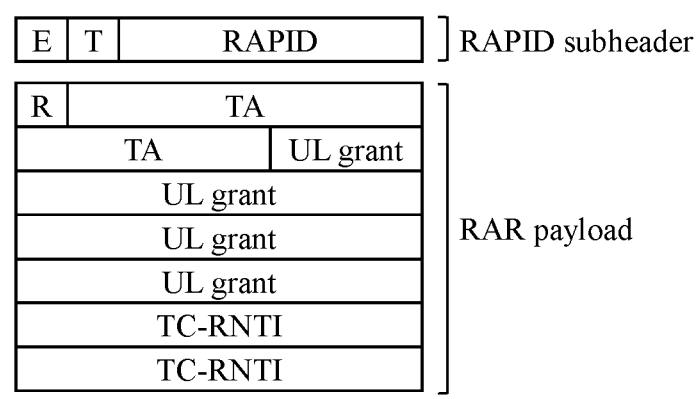
FIG. 10 illustrates an example of a RAR MAC PDU for a fallback from a 2-step RACH to a 4-step RACH in some implementations of the present disclosure.

FIG. 10 illustrates an example of a RAR MAC PDU for a fallback to a 4-step RACH in some implementations of the present disclosure. Referring to FIG. 10, the RAR MAC PDU for the fallback to the 4-step RACH may consist of a random access preamble ID (RAPID) subheader and a RAR payload. The format of the RAR MAC PDU may be used in the 4-step RACH.

The MAC subheader may consist of the extension field (E) field, the type (T) field, reserved bit (R), the backoff indicator (BI) field; and/or the random access preamble identifier (RAPID) field. The E field in the MAC subheader is a flag indicating if the MAC subPDU including this MAC subheadder is the last MAC subPDU or not in the RAR MAC PDU. Alternatively, the E field is a flag indicating if this MAC subheader is the last MAC subheader or not in the RAR MAC PDU. The T field in the MAC subheader is a flag indicating whether the MAC subheader contains an RAPID or a BI. For example, the T field is set to "0" to indicate the presence of a BI field in the MAC subheader, and the T field is set to "1" to indicate the presence of a RAPID field in the MAC subheader. The reserved bit (R) is set to "0". The BI field identified the overload condition in the cell. The size of the BI field is 4 bits. The RAPID field identifies the transmitted RAP. If the RAPID in the MAC subheader of a MAC subPDU corresponds to one of the RAPs configured for SI request, MAC RAR is not included in the MAC subPDU.

Referring to FIG. 10, the MAC RAR may consist of a reserved bit (R), the timing advance command (TA) field, the UL grant field, and the TC-RNTI field. The reserved bit (R) is set to 0. The TA field indicates the index value $T_A$ used to control the amount of timing adjustment that the MAC entity has to apply. The size of the TA field may be 12 bits. The UL grant field indicates the resources to be used on the uplink. The size of the UL grant field may be 27 bits. The TC-RNTI field indicates the temporary identify that is used by the MAC entity during random access. The size of the TC-RNTI field may be 16 bits.

Referring to FIG. 9(a), after receiving the RAR MAC PDU (e.g. RAR MAC PDU shown in FIG. 10) in response to the transmitted preamble, the UE may follow the conventional 4-step RACH procedure.

Referring to FIG. 9(b), however, if the UE receives MsgB including its UE ID (e.g., while the CR timer is running), the UE may consider that the random access (RA) procedure has been successfully completed. The MsgB may contain a UE ID which was transmitted in msgA. In some implementations of the present disclosure, the MsgB may contain TA, C-RNTI, and a RRC response message if the UE transmitted a RRC message in MsgA. If the CR timer has expired, the UE may consider unsuccessfully complete the RA procedure.

In some scenarios of the present disclosure, in the 2-step RACH, if the preamble is unsuccessfully transmitted to the network (e.g. BS), a UE cannot detect the failure of the RACH procedure until the CR timer expires.

Figure 11:
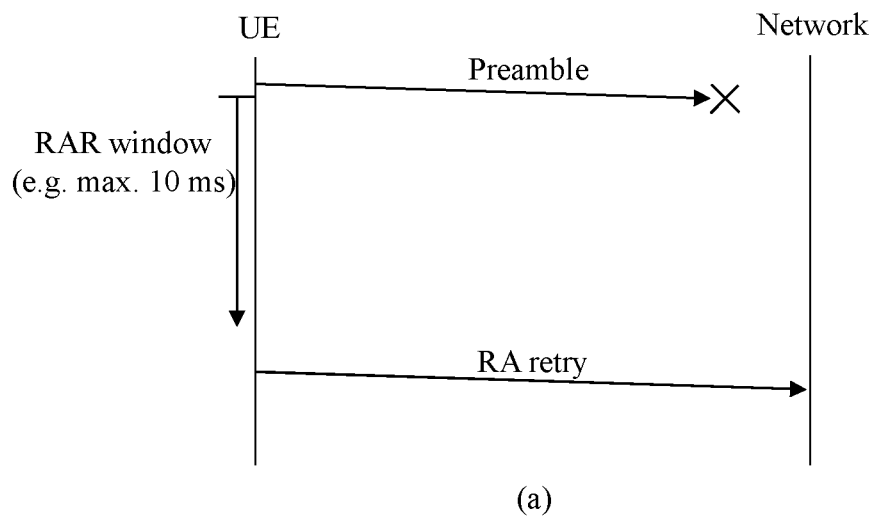
FIG. 11 illustrates examples of random access (RA) retry which may occur during the random access procedures.
Figure 11:
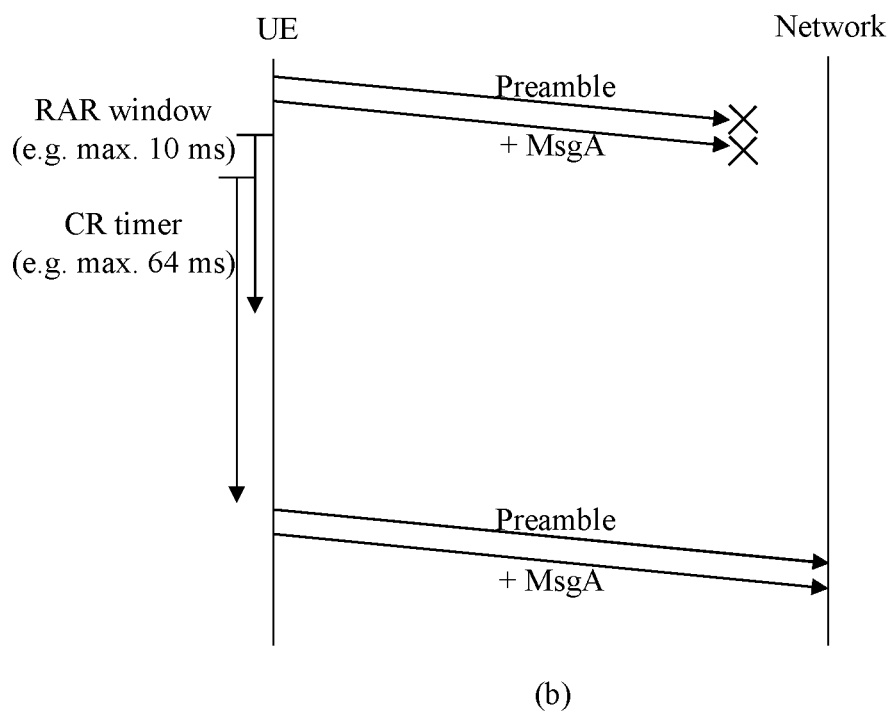

FIG. 11 illustrates examples of random access (RA) retry which may occur during the random access procedures. In particular, FIG. 11(a) illustrates an example of the RA retry in the 4-step RACH procedure, and FIG. 11(b) illustrates an example of the RA retry in the 2-step RACH procedure.

As shown in FIG. 11, when the network didn't receive any signal/preamble of a RACH procedure for a UE, it cannot do any operations for the UE. Generally, the UE may decide the failure of the RACH procedure after waiting for a while by using a timer. In the meanwhile, the UE initiated with a 2-step RACH procedure expects to receive MsgB even if the RAR window has expired, since the network would transmit the MsgB for the UE when successfully receiving both a preamble of MsgA and a PUSCH of the MsgA. In some scenarios which use a CR timer, if there is an error in transmission of an MsgB, it would be reasonable to retry a RACH procedure when the CR timer has expired. But, if there was an error during transmission of the preamble, but there was no error in transmission of the MsgB, it happens that the UE unnecessary waits for the expiry of the CR timer. In some scenarios, a value for the CR timer may be up to 64 ms which is much longer than the maximum value 10 ms for the RAR window timer. This could lead to the delay for the 2-step RACH retry.

To make the 2-step RACH procedure completed more fast, in some implementations of the present disclosure, a UE triggering a 2-step RACH procedure may receive a RAR MAC PDU including at least one of followings:

A MAC subheader with Backoff Indicator only;

A MAC subheader with RAPID only for system information (SI) request;

A MAC subheader with RAPID, and MAC RAR payload; and/or

A MAC subheader with RAPID payload for 2-step RACH.

A MAC subheader of the RAR MAC PDU may contain a RAPID of a random access preamble (RAP) included in a MsgA when the BS successfully receives both the RAP of the MsgA and a payload of the MsgA. If the BS receives multiple MsgAs, where each MsgA containing an RAP and a PUSCH payload, then the RAP MAC PDU may contain respective RAPIDs for MsgAs successfully received by the BS.

An RAPID contained in a MAC subheader of the RAP MAC PDU may inform the UE having transmitted the RAP of the RAPID that the UE should monitor MsgB. Alternatively, an RAPID contained in a MAC subheader of the RAP MAC PDU may inform the UE having transmitted the RAP of the RAPID may stop monitoring an Msg2 or RAR MAC PDU.

If the UE does not receive a RAR MAC PDU containing its RAPID until the RAR window timer expires, the UE may consider that the RAPID is not successfully transmitted to the network.

In some implementations of the present disclosure, the "RAPID payload for 2-step RACH" in a MAC subheader may be a value reserved for indicating the presence or absence of the RAPID payload in the RAR MAC PDU.

Figures 12, 13:
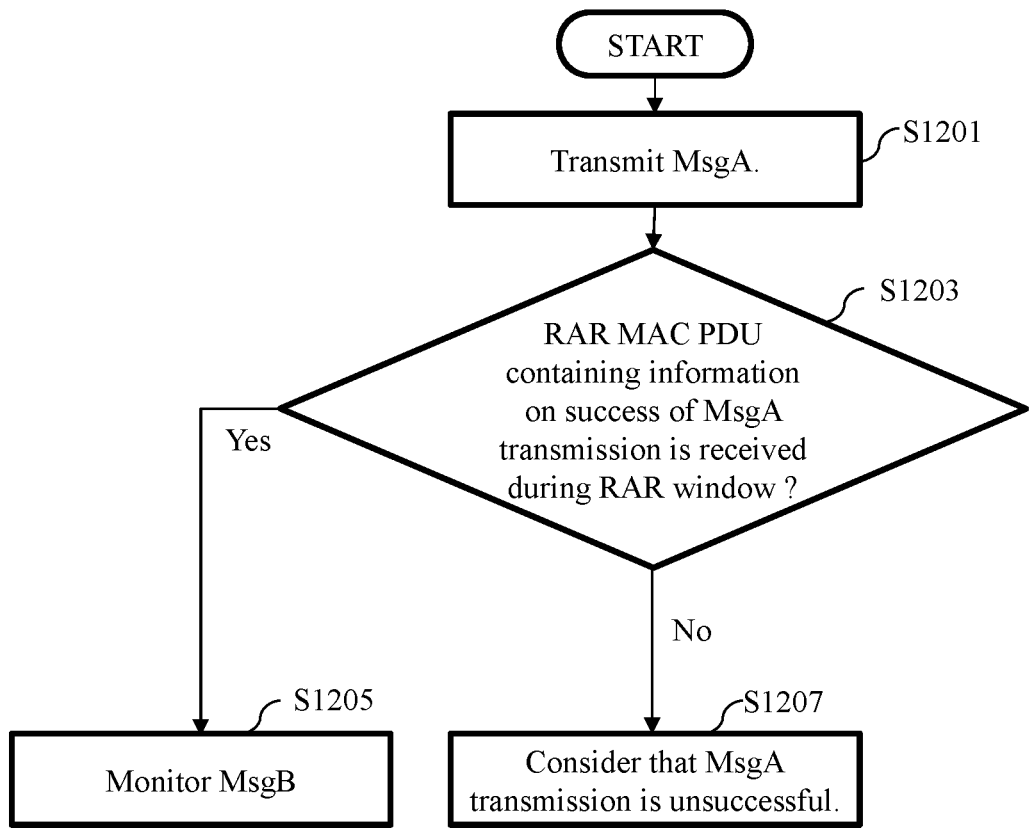
FIG. 12 illustrates an example of a random access procedure at a UE side according to some implementations of the present disclosure.
FIG. 13 shows an example of a RAPID payload according to some implementations of the present disclosure.

FIG. 12 illustrates an example of a random access procedure at a UE side according to some implementations of the present disclosure.

Referring to FIG. 12, a UE may transmit MsgA of a random access (RA) procedure (S1201). The MsgA may consist of or include at least i) a random access preamble (RAP) with a RAPID and ii) a UL-SCH payload.

The UE may monitor a RAR MAC PDU during a RAR window (S1203). In the present disclosure, monitoring something may imply attempting to decode or detect that thing. The duration for the RAR window (e.g. a timer value for the RAR window) may be configured by the network (e.g. BS) to the UE through RRC signaling.

In some implementations of the present disclosure, if the UE receives a RAR MAC PDU containing information representing the success of transmission of the MsgA during the RAR window (S1203, Yes), the UE may monitor MsgB (S1205). In some scenarios where the CR timer is used in a RACH procedure, the UE may monitor MsgB while the CR timer is running. The value for the CR timer may be configured by the network to the UE through RRC signaling. If the UE does not receive or fails to receive a RAR MAC PDU containing information representing the success of transmission of the msgA during the RAR window (S1203, No), the UE may consider that transmission of the msgA is unsuccessful. If the maximum number (hereinafter, maximum value) of random access (RA) preamble transmissions performed before the UE declares a failure of the random access (RA) procedure configured and the number of preamble transmissions performed by the UE for the RA procedure does not exceed the maximum value, the UE may retry the RA procedure by transmitting a RAP. If the number of preamble transmissions performed by the UE for the RA procedure has reached the maximum value, then the UE may consider the RA procedure unsuccessfully completed and terminate the RA procedure.

For example, in some implementations of the present disclosure, if the UE receives a RAR MAC PDU with a RAPID payload for a 2-step RACH and the RAPID payload contains a RAPID of the RAP which was transmitted in a MsgA by the UE (S1203, Yes), then the UE may stop the RAR window timer, and monitor an MsgB (S1205). In some scenarios where the CR timer is used in the 2-step RACH, if the UE receives a RAR MAC PDU with a RAPID payload for a 2-step RACH and the RAPID payload contains a RAPID of the RAP which was transmitted in the MsgA by the UE (S1203, Yes), then the UE may perform at least one of the following operations: stopping the RAR window timer; starting the CR timer; and monitoring the MsgB (S1205) while the CR timer is running.

If the UE doesn't receive a RAR MAC PDU with a RAP ID of a RAP transmitted in MsgA by the UE until the RAR window timer expires (S1203, No), then the UE may consider that the MsgA is unsuccessfully transmitted to the network (S1207), and increment the preamble transmission counter by 1. If the preamble transmission counter is equal to the maximum value plus 1, the UE considers the RA procedure unsuccessfully completed. If the preamble transmission counter is not equal to the maximum value plus 1, the UE retries the RA procedure.

In particular, in some implementations of the present disclosure, a RAR MAC PDU format including a new MAC subheader with a RAPID payload for the 2-step RACH may be used, and a method for indicating whether a RAR MAC PDU contains a RAPID payload for the 2-step RACH may be used. In some implementations of the present disclosure, a UE may perform the 2-step RACH procedure with a RAR MAC PDU described below.

In some implementations of the present disclosure, the MAC subheader with RAP ID(s) payload for the 2-step RACH includes RAP ID(s) for the MsgA(s) when the BS successfully receives both a RAP ID and payload of a corresponding MsgA. It is preferable that RAP IDs contained in the same MAC subheader are addressed by the same RA-RNTI.

FIG. 13 shows an example of a RAPID payload according to some implementations of the present disclosure.

The length field in FIG. 13 may indicate the number of RAPIDs for MsgAs successfully received by the BS. For example, the length field in a RAPID payload may indicate the number of RAPIDs included in the RAPID payload. The total length of the RAPID payload may be determined based on the value n of the length field. For example, the RAPID payload may be determined as (n+1) bytes.

In an RAR MAC PDU of some scenarios, the Type (T) field in a MAC subheader is a flag indicating whether the MAC subheader contains a Random Access Preamble ID (RAPID) or a Backoff Indicator. If the MAC subheader contains RAPID, 'MAC subPDU(s) with RAPID only' and 'MAC subPDU(s) with RAPID and MAC RAR' may be placed anywhere between (i) a MAC subPDU with Backoff Indicator only (if any) and (ii) padding (if any). The 'MAC subPDU(s) with RAPID only' is indicated by the RAPID reserved for a system information (SI) request. If the RAPID is not for the SI request, then the UE expects that there is the MAC RAR payload following the MAC subheader with RAPID. To this end, a method for distinguishing 'RAPID payload for 2-step RACH' from 'MAC RAR payload' needs to be defined.

Figure 14:
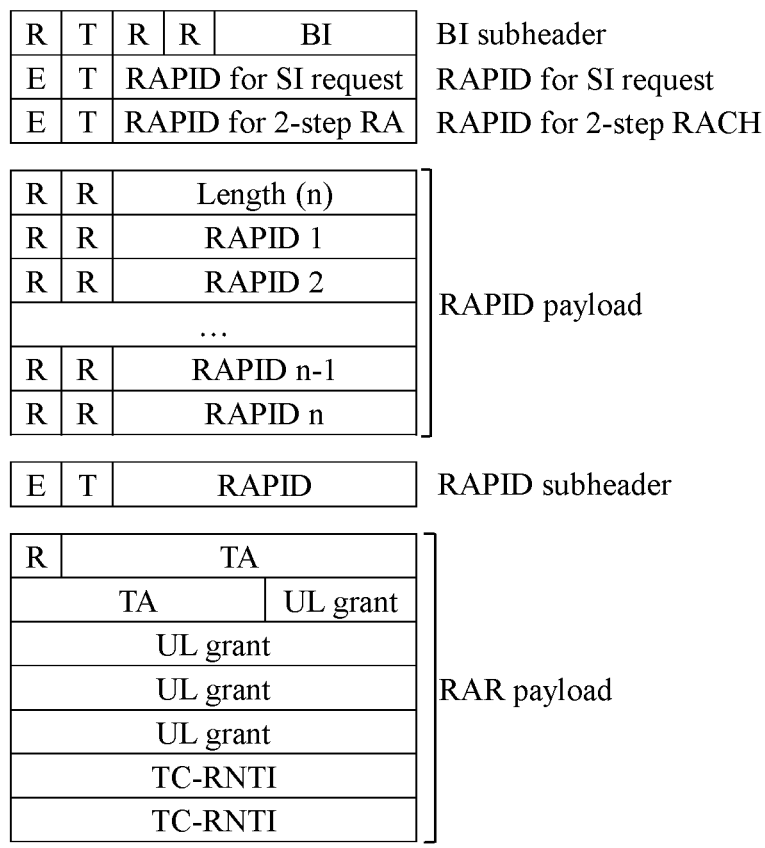
FIG. 14 shows an example of a 'MAC subPDU with RAPID and RAPID payload' according to some implementations of the present disclosure.

FIG. 14 shows an example of a 'MAC subPDU with RAPID and RAPID payload' according to some implementations of the present disclosure. In some scenarios of the wireless communication system, the RAPID subheader may consist of three header fields E/T/RAPID. Since there is no room to indicate the new type in such scenarios, a reserved RAPID value for indicating the 'MAC subPDU with RAPID(s) only payload for 2-step RACH' is used in some implementations of the present disclosure. For example, the network may reserve a value '0b111111' for the 'MAC subPDU with RAPID and RAPID payload for 2-step RACH', or the reserved bits '0b111111' for the 'MAC subPDU with RAPID and RAPID payload for 2-step RACH' may be defined in the MAC standards.

The UE expects that there is the RAPID payload for 2-step RACH after the RAPID subheader if the RAPID is the reserved value for the 2-step RACH. Then, the UE which has triggered the 2-step RACH determines whether the RAPID payload contains its RAPID which the UE has transmitted in an MsgA. If the RAPID in the MAC subheader is not for the 2-step RACH or SI request, the UE expects that there is the RAR payload after the RAPID subheader.

Figure 15:
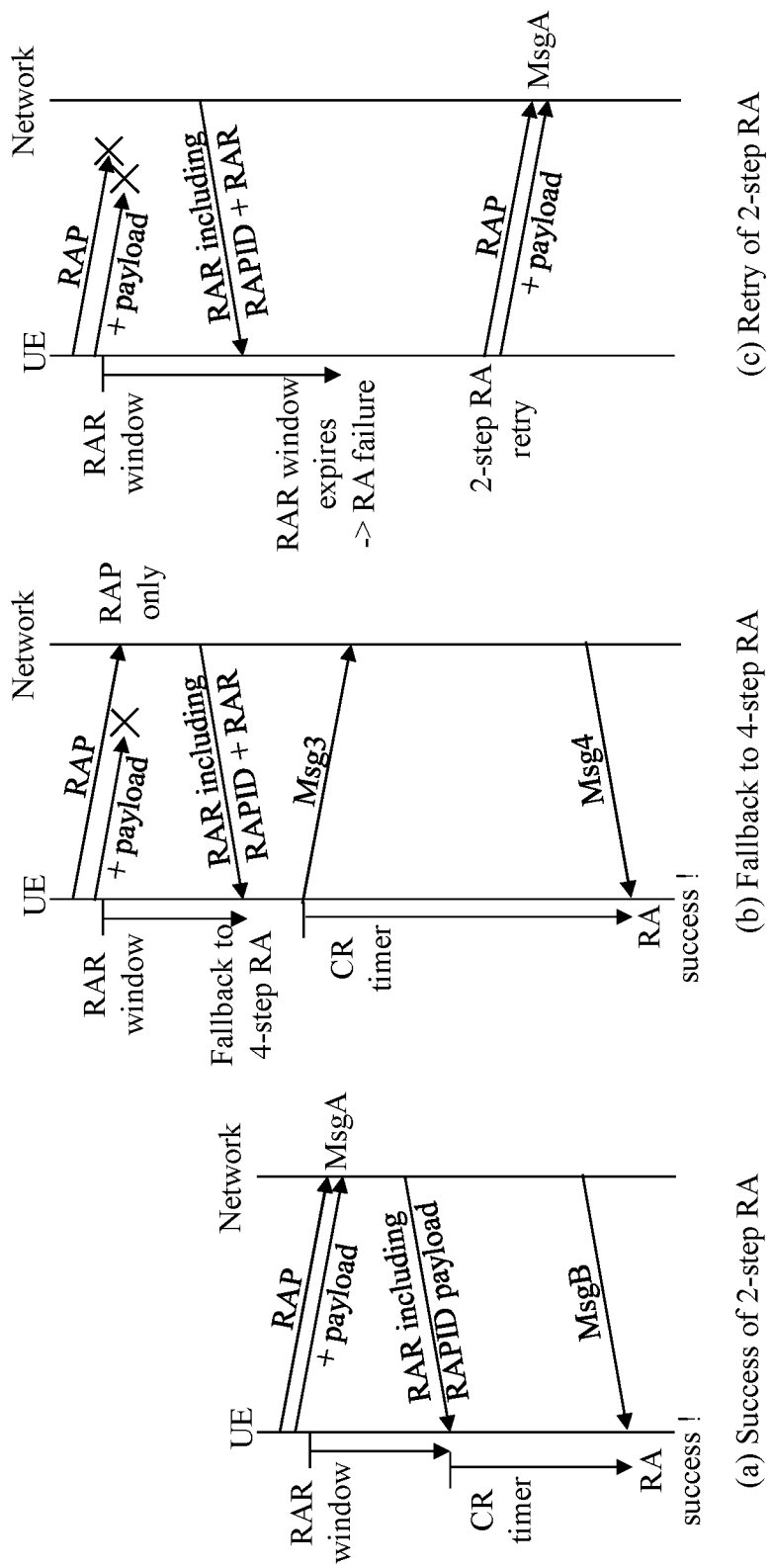
FIG. 15 illustrates examples of UE and network behaviors based on some implementations of the present disclosure.

FIG. 15 illustrates examples of UE and network behaviors based on some implementations of the present disclosure.

In some implementations of the present disclosure, a UE triggers a 2-step RA procedure. The UE transmits an MsgA formed with a randomly selected RAP (with RAP ID) and a payload. The UE may start the RAR window timer when the UE transmits the MsgA. The UE monitors a RAR MAC PDU addressed by an RA-RNTI while the RAR window timer is running.

Referring to FIG. 15(a), if the UE receives the RAR MAC PDU including a MAC subPDU which contains the RAPID for the 2-step RACH and an RAPID payload, and if the RAPID payload contains the RAPID of the RAP transmitted in the MsgA by the UE, the UE stops the RAR window timer; and monitors the UE monitors an MsgB. In some scenarios where the CR timer is used in the 2-step RA, the UE may start the CR timer; and monitor the msgB while the CR timer is running.

Referring to FIG. 15(b), if the UE receives the RAR MAC PDU including a MAC subPDU which contains the RAPID of the RAP transmitted in the MsgA by the UE and an RAR payload, the UE may stop the RAR window timer; transmit a Msg3 by using the UL grant included in an RAR message; start the CR timer; and monitor a Msg4 while the CR timer is running. In other words, if the UE receives the RAR MAC PDU including a MAC subPDU which contains the RAPID of the RAP transmitted in the MsgA by the UE and an RAR payload, the UE may fall back to a 4-step RA procedure based on the RAR message.

Referring to FIG. 15(c), if the RAR window timer has expired and the UE doesn't receive a RAR MAC PDU including the RAPID of the RAP transmitted in the MsgA, the UE may increment the preamble transmission counter by 1. If the preamble transmission counter is equal to the maximum value plus 1, the UE considers the RA procedure unsuccessfully completed. If the preamble transmission counter is not equal to the maximum value plus 1, the UE retries the RA procedure.

In some implementations of the present disclosure, the network may receive one or more RAP(s) on a PRACH occasion. The network may decode a payload associated with each RAP received by the network. If the network successfully receives both a RAP of an MsgA and payload of the MsgA, for the successfully received RAP, the network may generate a MAC subPDU which contains a RAPID subheader and a RAPID payload including the RAPID(s) for the successfully received RAPs. Else if the network successfully receives RAP only (and does not receive payload associated with the received RAP), for each of the successfully received RAP(s), the network may generate a MAC subPDU which contains i) a RAPID of a successfully received RAP and ii) an associated RAR payload for fallback to the 4-step RA procedure. The network may transmit the RAR MAC PDU including the generated MAC subPDU(s).

Figure 16:
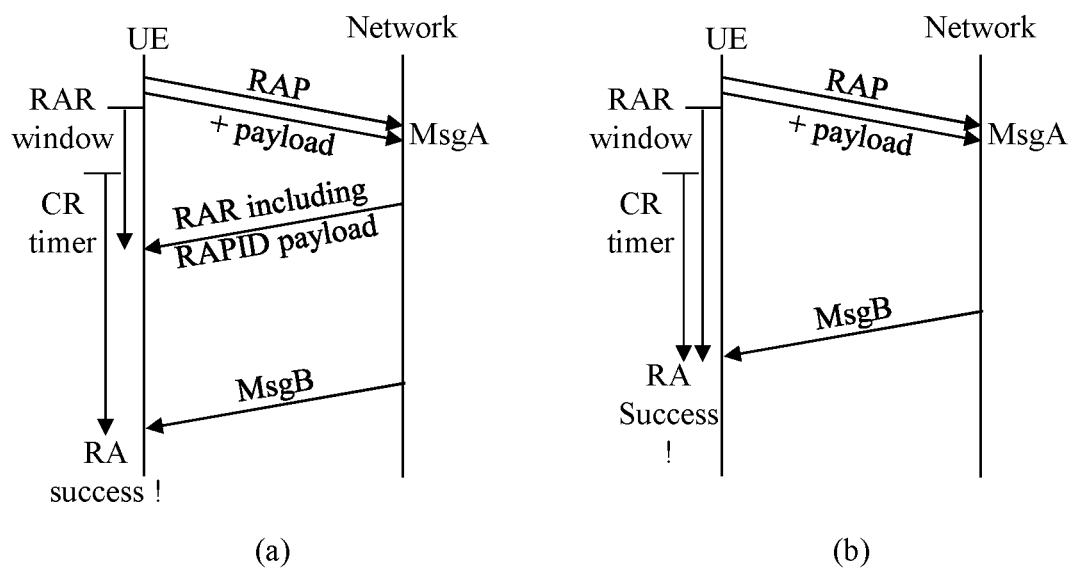
FIG. 16 illustrates examples of UE behavior which monitors both of a random access response and an MsgB according some implementations of the present disclosure.

FIG. 16 illustrates examples of UE behavior which monitors both of a random access response and an MsgB according some implementations of the present disclosure.

In some implementations of the present disclosure, the UE may start the CR timer while the RAR window timer is running, as shown in FIG. 16. For example, the UE may monitor both the RAR MAC PDU addressed by RA-RNTI while the RAR window is running and the MsgB addressed by TC-RNTI while the CR timer is running. If the UE firstly receives a RAR MAC PDU which contains the RAPID payload containing the RAP ID of the RAP transmitted in the msgA, the UE may stop the RAR window timer and only monitor the MsgB while the CR timer is running. If the UE firstly receives MsgB containing the UEID or C-RNTI transmitted in MsgA, the UE may stop both of the CR timer and the RAR window timer, and consider the RA procedure successfully completed.

Alternatively, in some implementations of the present disclosure, the RAPID payload may be indicated by a new type field, e.g., T2, in a backoff indicator (BI) subheader.

Figure 17:
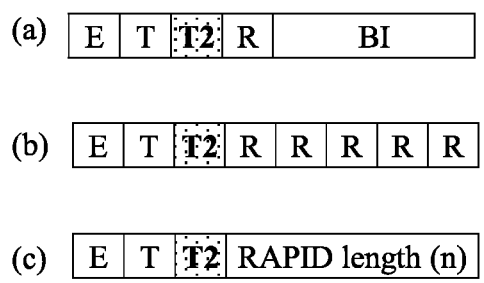
FIG. 17 shows examples of a new type field indicating whether a corresponding MAC subheader is for a backoff indicator (BI) or random access preamble identifier (RAPID) payload.

FIG. 17 shows examples of a new type field indicating whether a corresponding MAC subheader is for a backoff indicator (BI) or random access preamble identifier (RAPID) payload. In particular, FIG. 17(a) shows an example of a MAC subheader which contains a BI and a new type field according to some implementations of the present disclosure, and FIG. 17(b) and FIG. 17(c) show examples of a MAC subheader including information representing presence of RAPID(s) related to the 2-step RA. Hereinafter, the MAC subheader including a BI is referred to as a BI subheader, and the MAC subheader including information representing presence of RAPID(s) related to the 2-step RA is referred to as a RAPID subheader.

In some implementations of the present disclosure, the E field is a flag indicating if this MAC subheader is the last MAC subheader or not in the RAR MAC PDU. In some implementations of the present disclosure, the T field may indicate whether the MAC subheader contains an RAPID or not. For example, the T field is set to "1" to indicate the presence of a RAPID field in the MAC subheader. The reserved bit (R) is set to "0", and the T field is set to "0" to indicate that the MAC subheader is a BI subheader or RAPID subheader for 2-step RA. For example, if the T field is set to "0", one of two R bits following the T field may be used as the T2 field.

In some implementations of the present disclosure, the T2 field is a flag indicating whether i) the MAC subheader contains a Backoff Indicator (BI) or ii) the MAC subheader is followed by a Random Access Preamble ID (RAP) payload following. For example, the T2 field is set to "0" to indicate the presence of a Backoff Indicator field in the MAC subheader (BI). The T2 field is set to "1" to indicate the presence of a Random Access Preamble ID payload after the MAC subheader.

Figure 18:
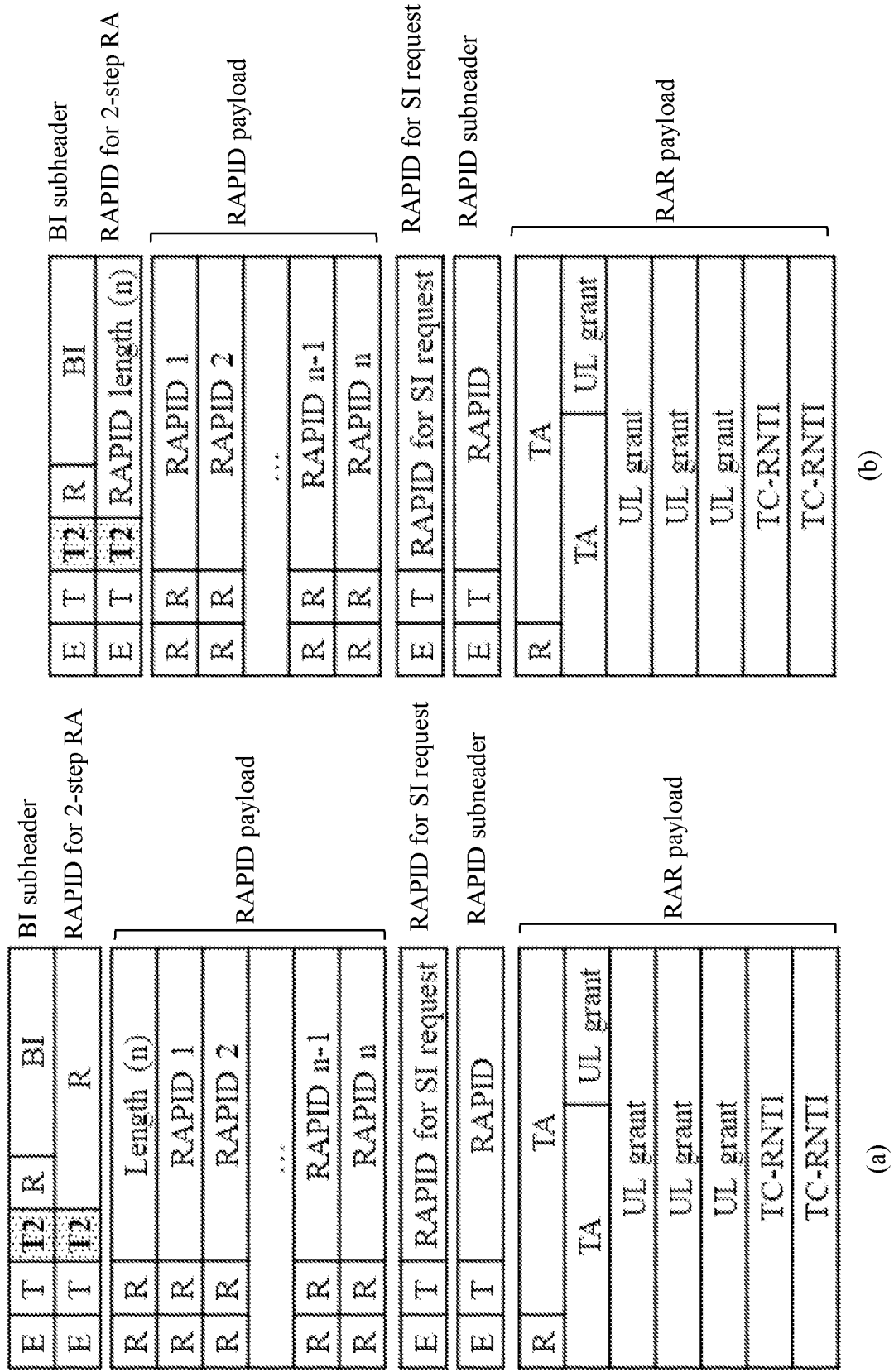
FIG. 18 illustrates examples of RAR MAC PDU including one or more RAPIDs according to some implementations of the present disclosure.

FIG. 18 illustrates examples of RAR MAC PDU including one or more RAPIDs according to some implementations of the present disclosure.

If the T2 field indicates the presence of a RAPID payload after the MAC subheader, then the UE should decode the RAPID payload. Here, the RAPID length field may be located in the RAPID payload as shown in FIG. 18(a) or in the MAC subheader as shown in the FIG. 18(b). If the RAPID length field is located in the MAC subheader, the RAPID length field cannot represent the total number of RAPIDs because the reserved bits which can be used for the RAPID length field are only 5 bits when the maximum number of RAPIDs is 64. But, if needed, the BS may attach one more RAPID subheader and payload after the RAPID subheader by using the extension (E) field. This method may be advantageous for fast decoding at the UE since the UE can recognize the total length of the RAPID payload before decoding the RAPID payload.

Although implementations of the present disclosure have been mainly described using the RAR MAC PDU, some implementations of the present disclosure may be applicable to any method for allowing a UE to recognize the success/failure of MsgA transmission through reception of another MAC PDU including a RAPID of a RAP which has transmitted in MsgA of the UE.

Referring to FIG. 2, one of the first device 100 and the second device 1200 may be the UE described above. Hereinafter, for convenience of description, it is assumed that the first device 100 acts as the UE according to some implementations of the present disclosure, and the second device 200 acts as the BS according to some implementations of the present disclosure. The processor(s) 102 connected to, mounted on or launched in the first device 100 may be configured to perform the UE behaviour described above or control the transceiver(s) 106 to perform the UE behaviour described above. For example, the processor(s) 102 may be configured to transmit (or control the transceiver(s) 106 to transmit) an MsgA of a RA procedure according to some implementations of the present disclosure. The processor(s) 102 may be configured to monitor a RAR MAC PDU during a RAR window. For example, the processor(s) 102 may be configured to attempt to decode or detect a RAR MAC PDU during the RAR window. The processor(s) may perform operations of monitoring an MsgB, or consider transmission of the MsgA unsuccessful, depending on whether the RAR MAC PDU is received or not, and/or whether the RAR MAC PDU contains information representing success of the MsgA transmission. In some implementations of the present disclosure, the processor(s) 202 may be configured to include the RAPID of the RAP transmitted by the UE in the RAR MAC PDU, when the BS successfully receives both the RAP and a UL data payload in the MsgA. The processor(s) 102 may be configured to retry (or control the transceiver(s) 106 to retry) the RA procedure if the processor(s) 102 successfully receives the RAR MAC PDU containing information representing the success of the MsgA transmission.

In some scenarios, the processor(s) 102 may be configured to perform a 4-step RA procedure if the processor(s) 102 determines that the 2-step RA procedure (or the MsgA transmission for the 2-step RA procedure) is unsuccessfully completed.

The processor(s) 202 may be configured to generate a RAR MAC PDU based on an RAR MAC PDU format according to some implementations of the present disclosure, and transmit, via the transceiver(s) 206, the RAR MAC PDU to the UE during the RAR window. The processor(s) 102 at the UE side may receive, the transceiver(s) 106, the RAR MAC PDU during the RAR window, and decode or interpret the RAR MAC PDU based on the RAR MAC PDU format according to some implementations of the present disclosure.

In some implementations of the present disclosure, the UL data payload transmitted in MsgA may be transmitted/received on a physical channel (e.g. PUSCH) based on resource allocation (e.g. UL grant). In order to transmit the UL data payload, a UE shall have uplink resources available to the UE. In order for a BS to receive the UL payload of MsgA, the BS may have uplink resources available to the UE.

In the present disclosure, uplink resource allocation is also referred to as uplink grant, and downlink resource allocation is also referred to as downlink assignment. The resource allocation includes time domain resource allocation and frequency domain resource allocation.

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a Random Access Response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the Cell Radio Network Temporary Identifier (C-RNTI) on PDCCH(s). A UE always monitors the PDCCH(s) in order to find possible grants for uplink transmission when its downlink reception is enabled (activity governed by discontinuous reception (DRX) when configured). In addition, with Configured Grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to Configured Scheduling RNTI (CS-RNTI) can either signal and activate the configured uplink grant, or deactivate it; i.e. a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with Semi-Persistent Scheduling (SPS), the BS can allocate downlink resources for the initial HARQ transmissions to UEs: RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

Resource Allocation by PDCCH (i.e. Resource Allocation by DCI)

PDCCH can be used to schedule DL transmissions on PDSCH and UL transmissions on PUSCH, where the downlink control information (DCI) on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 19:
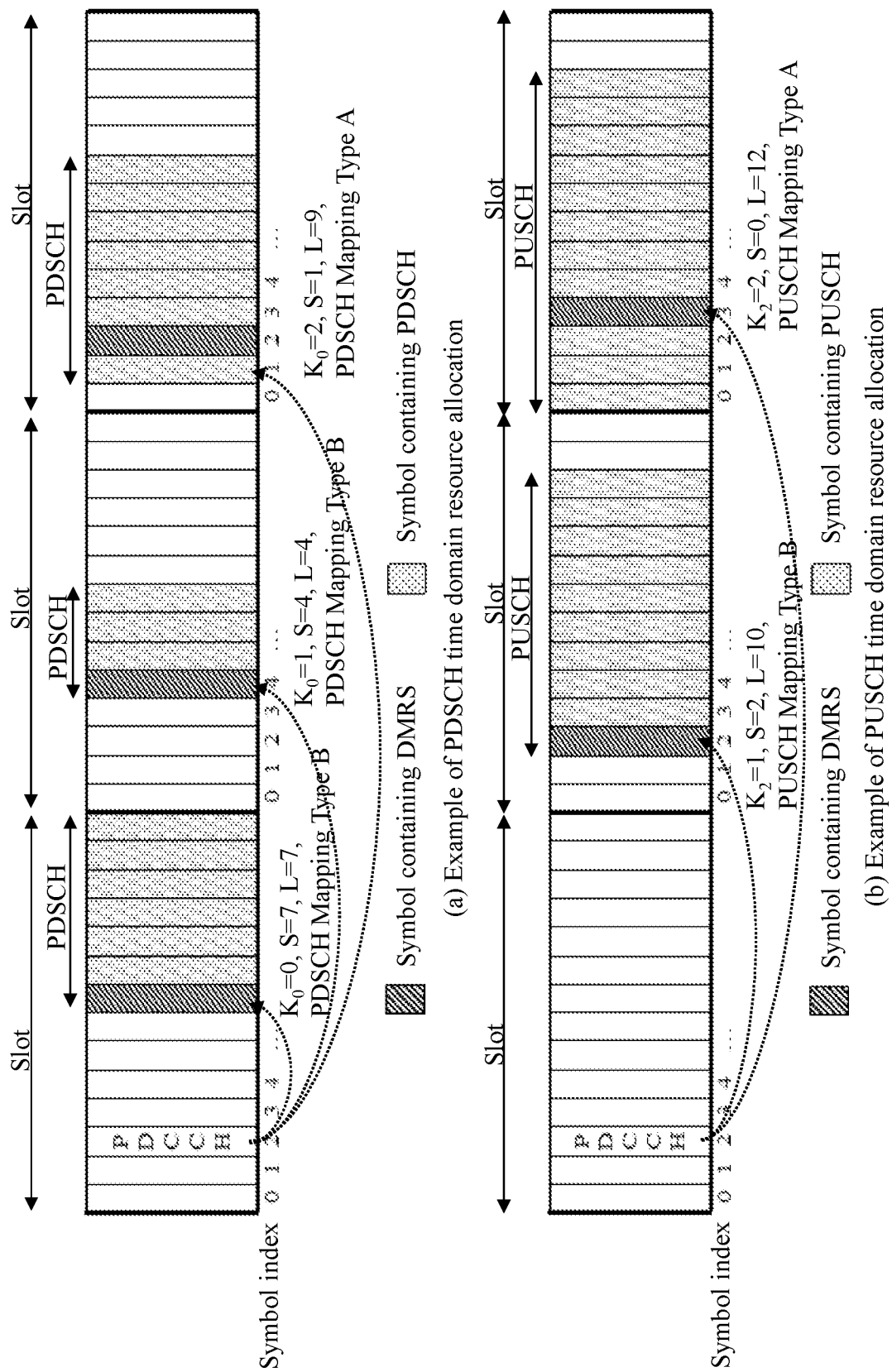
FIG. 19 illustrates an example of PDSCH time domain resource allocation by PDCCH, and an example of PUSCH time resource allocation by PDCCH.

FIG. 19 illustrates an example of PDSCH time domain resource allocation by PDCCH, and an example of PUSCH time resource allocation by PDCCH.

Downlink control information (DCI) carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule (e.g. Table 5.1.2.1.1-1 in 3GPP TS 38.214 v15.3.0, Table 6.1.2.1.1-1 in 3GPP TS 38.214 v15.3.0).

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or 4th symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

Resource Allocation by RRC

As mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:
  cs-RNTI which is CS-RNTI for retransmission;
  periodicity which provides periodicity of the configured grant Type 1;
  timeDomainOffset which represents offset of a resource with respect to SFN=0 in time domain;
  timeDomainAllocation value m which provides a row index m+1 pointing to an allocation table, indicating a combination of a start symbol S and length L and PUSCH mapping type;
  frequencyDomainAllocation which provides frequency domain resource allocation; and
  mcsAndTBS which provides $I_{MCS}$ representing the modulation order, target code rate and transport block size.
Upon configuration of a configured grant Type 1 for a serving cell by RRC, the UE stores the uplink grant provided by RRC as a configured uplink grant for the indicated serving cell, and initialise or re-initialise the configured uplink grant to start in the symbol according to timeDomainOffset and S (derived from SLIT), and to reoccur with periodicity. After an uplink grant is configured for a configured grant Type 1, the UE considers that the uplink grant recurs associated with each symbol for which: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0.

A UE is provided with at least the following parameters via RRC signaling from a BS when the configured gran Type 2 is configured:
  cs-RNTI which is CS-RNTI for activation, deactivation, and retransmission; and
  periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which: [(SFN*numberOfSlotsPerFrame*numberOfSymbols PerSlot)+(slot number in the frame*numberOfSymbolsPerSlot)+symbol number in the slot]=[(SFN$_{start\ time}$*numberOfSlotsPerFrame*numberOfSymbolsPerSlot+ slot$_{start}$ $_{time}$*numberOfSymbolsPerSlot+ symbol$_{start}$ $_{time}$)+N*periodicity] modulo (1024*numberOfSlotsPerFrame*numberOfSymbols PerSlot), for all N>=0, where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised. numberOfSlotsPerFrame and numberOfSymbolsPerSlot refer to the number of consecutive slots per frame and the number of consecutive OFDM symbols per slot, respectively (see Table 1 and Table 2).

For configured uplink grants, the HARQ Process ID associated with the first symbol of a UL transmission is derived from the following equation:

HARQ Process ID=[floor(CURRENT_symbol/periodicity)] modulo nrofHARQ-Processes where CURRENT_symbol= (SFN*numberOfSlotsPerFrame*numberOfSymbols PerSlot+slot number in the frame*numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211. CURRENT_symbol refers to the symbol index of the first transmission occasion of a repetition bundle that takes place. A HARQ process is configured for a configured uplink grant if the configured uplink grant is activated and the associated HARQ process ID is less than nrofHARQ-Processes.

For downlink, a UE may be configured with semi-persistent scheduling (SPS) per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:

cs-RNTI which is CS-RNTI for activation, deactivation, and retransmission;

nrofHARQ-Processes: which provides the number of configured HARQ processes for SPS;

periodicity which provides periodicity of configured downlink assignment for SPS. When SPS is released by upper layers, all the corresponding configurations shall be released.

After a downlink assignment is configured for SPS, the UE considers sequentially that the $N^{th}$ downlink assignment occurs in the slot for which: (numberOfSlotsPerFrame*SFN+slot number in the frame)= [(numberOfSlotsPerFrame*$SFN_{start\ time}$+$slot_{start\ time}$)+ N*periodicity*numberOfSlotsPerFrame/10] modulo (1024*numberOfSlotsPerFrame), where $SFN_{start\ time}$ and $slot_{start\ time}$ are the SFN and slot, respectively, of the first transmission of PDSCH where the configured downlink assignment was (re-)initialised.

For configured downlink assignments, the HARQ Process ID associated with the slot where the DL transmission starts is derived from the following equation:

HARQ Process ID=[floor(CURRENT slot*10/
(numberOfSlotsPerFrame*periodicity))] modulo
nrofHARQ-Processes where CURRENT slot= [(SFN*numberOfSlotsPerFrame)+slot number in the frame] and numberOfSlotsPerFrame refers to the number of consecutive slots per frame as specified in TS 38.211.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 5 or Table 6. Table 5 shows special fields for DL SPS and UL grant Type 2 scheduling activation PDCCH validation, and Table 6 shows special fields for DL SPS and UL grant Type 2 scheduling release PDCCH validation.

TABLE 5

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 6

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g. time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2.

The time-frequency resource for PUSCH of the MsgA may be predefined to have a certain mapping relation with the PRACH occasion (e.g. time-frequency resource for transmission of the RAP) and/or the RAPID of the RAP in the MsgA. Alternatively, the time-frequency resource for PUSCH of the MsgA may be configured or allocated by the BS to have a certain mapping relation with the PRACH occasion (e.g. time-frequency resource for transmission of the RAP) and/or the RAPID of the RAP in the MsgA.

The processor(s) 102 of the present disclosure may transmit (or control the transceiver(s) 106 to transmit) the UL data payload of the MsgA based on the UL grant available to the processor(s) 102. The processor(s) 202 may receive (or control its transceiver(s) 206 to receive) the UL data payload of the MsgA based on the UL grant available to the UE.

The UL data is subject to the physical layer processing at a transmitting side before transmission via radio interface, and the radio signals carrying the UL data are subject to the physical layer processing at a receiving side. For example, a MAC PDU including the UL payload of the MsgA and/or a RAR MAC PDU may be subject to the physical layer processing as follows.

Figure 20:
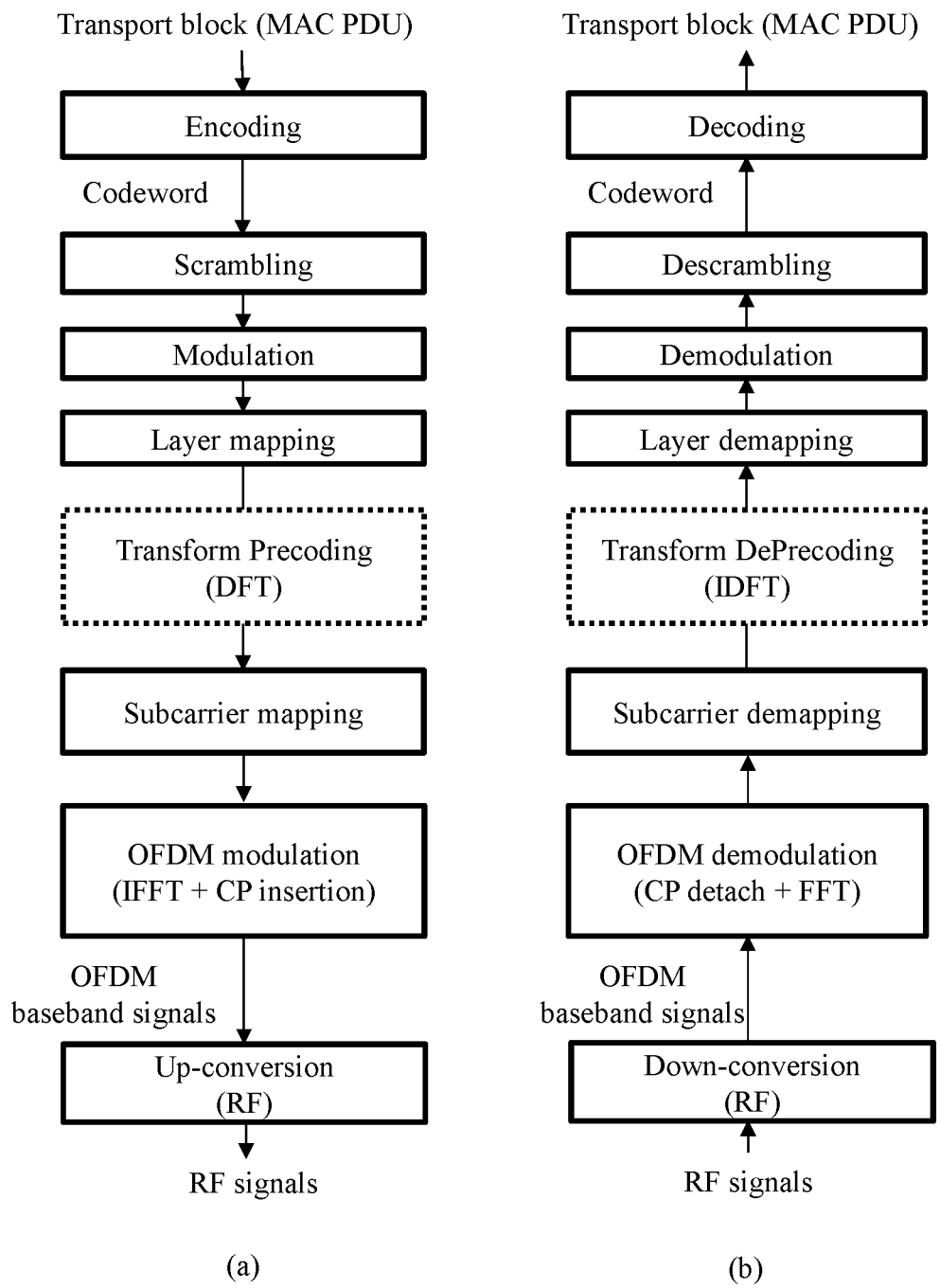
FIG. 20 illustrates an example of physical layer processing for some implementations of the present disclosure.

FIG. 20 illustrates an example of physical layer processing for some implementations of the present disclosure.

FIG. 20(a) illustrates an example of physical layer processing at a transmitting side.

The following tables show the mapping of the transport channels (TrCHs) and control information to its corresponding physical channels. In particular, Table 7 specifies the mapping of the uplink transport channels to their corresponding physical channels, Table 8 specifies the mapping of the uplink control channel information to its corresponding physical channel, Table 9 specifies the mapping of the downlink transport channels to their corresponding physical channels, and Table 10 specifies the mapping of the downlink control channel information to its corresponding physical channel.

TABLE 7

| TrCH | Physical Channel |
|---|---|
| UL-SCH | PUSCH |
| RACH | PRACH |

TABLE 8

| Control information | Physical Channel |
|---|---|
| UCI | PUCCH, PUSCH |

TABLE 9

| TrCH | Physical Channel |
|---|---|
| DL-SCH | PDSCH |
| BCH | PBCH |
| PCH | PDSCH |

TABLE 10

| Control information | Physical Channel |
|---|---|
| DCI | PDCCH |

Encoding

Data and control streams from/to MAC layer are encoded to offer transport and control services over the radio transmission link in the PHY layer. For example, a transport block from MAC layer is encoded into a codeword at a transmitting side. Channel coding scheme is a combination of error detection, error correcting, rate matching, interleaving and transport channel or control information mapping onto/splitting from physical channels.

In the 3GPP NR system, following channel coding schemes are used for the different types of TrCH and the different control information types.

TABLE 11

| TrCH | Coding scheme |
|---|---|
| UL-SCH | LDPC |
| DL-SCH | |
| PCH | |
| BCH | Polar code |

TABLE 12

| Control Information | Coding scheme |
|---|---|
| DCI | Polar code |
| UCI | Block code |
| | Polar code |

For transmission of a DL transport block (i.e. a DL MAC PDU) or a UL transport block (i.e. a UL MAC PDU), a transport block CRC sequence is attached to provide error detection for a receiving side. In the 3GPP NR system, the communication device uses low density parity check (LDPC) codes in encoding/decoding UL-SCH and DL-SCH. The 3GPP NR system supports two LDPC base graphs (i.e. two LDPC base matrixes): LDPC base graph 1 optimized for small transport blocks and LDPC base graph 2 for larger transport blocks. Either LDPC base graph 1 or 2 is selected based on the size of the transport block and coding rate R. The coding rate R is indicated by the modulation coding scheme (MCS) index $I_{MCS}$. The MCS index is dynamically provided to a UE by PDCCH scheduling PUSCH or PDSCH, provided to a UE by PDCCH activating or (re-) initializing the UL configured grant 2 or DL SPS, or provided to a UE by RRC signaling related to the UL configured grant Type 1. If the CRC attached transport block is larger than the maximum code block size for the selected LDPC base graph, the CRC attached transport block may be segmented into code blocks, and an additional CRC sequence is attached to each code block. The maximum code block sizes for the LDPC base graph 1 and the LDPC base graph 2 are 8448 bits and 3480 bits, respectively. If the CRC attached transport block is not larger than the maximum code block size for the selected LDPC base graph, the CRC attached transport block is encoded with the selected LDPC base graph. Each code block of the transport block is encoded with the selected LDPC base graph. The LDPC coded blocks are then individually rat matched. Code block concatenation is performed to create a codeword for transmission on PDSCH or PUSCH. For PDSCH, up to 2 codewords (i.e. up to 2 transport blocks) can be transmitted simultaneously on the PDSCH. PUSCH can be used for transmission of UL-SCH data and layer ½ control information. Although not shown in FIG. 20, the layer 1/2 control information may be multiplexed with the codeword for UL-SCH data.

Scrambling and Modulation

The bits of the codeword are scrambled and modulated to generate a block of complex-valued modulation symbols.

Layer Mapping

The complex-valued modulation symbols of the codeword are mapped to one or more multiple input multiple output (MIMO) layers. A codeword can be mapped to up to 4 layers. A PDSCH can carry two codewords, and thus a PDSCH can support up to 8-layer transmission. A PUSCH supports a single codeword, and thus a PUSCH can support up to 4-layer transmission.

Transform Precoding

The DL transmission waveform is conventional OFDM using a cyclic prefix (CP). For DL, transform precoding (in other words, discrete Fourier transform (DFT)) is not applied.

The UL transmission waveform is conventional OFDM using a CP with a transform precoding function performing DFT spreading that can be disabled or enabled. In the 3GPP NR system, for UL, the transform precoding can be optionally applied if enabled. The transform precoding is to spread UL data in a special way to reduce peak-to-average power ratio (PAPR) of the waveform. The transform precoding is a form of DFT. In other words, the 3GPP NR system supports two options for UL waveform: one is CP-OFDM (same as DL waveform) and the other one is DFT-s-OFDM. Whether a UE has to use CP-OFDM or DFT-s-OFDM is configured by a B S via RRC parameters.

Subcarrier Mapping

The layers are mapped to antenna ports. In DL, for the layers to antenna ports mapping, a transparent manner (non-codebook based) mapping is supported and how beamforming or MIMO precoding is performed is transparent to the UE. In UL, for the layers to antenna ports mapping, both the non-codebook based mapping and a codebook based mapping are supported.

For each antenna port (i.e. layer) used for transmission of the physical channel (e.g. PDSCH, PUSCH), the complex-valued modulation symbols are mapped to subcarriers in resource blocks allocated to the physical channel.

OFDM Modulation

The communication device at the transmitting side generates a time-continuous OFDM baseband signal on antenna port p and subcarrier spacing configuration u for OFDM symbol l in a TTI for a physical channel by adding a cyclic prefix (CP) and performing IFFT. For example, for each OFDM symbol, the communication device at the transmitting side may perform inverse fast Fourier transform (IFFT) on the complex-valued modulation symbols mapped to resource blocks in the corresponding OFDM symbol and add a CP to the IFFT-ed signal to generate the OFDM baseband signal.

Up-Conversion

The communication device at the transmitting side up-convers the OFDM baseband signal for antenna port p, subcarrier spacing configuration u and OFDM symbol l to a carrier frequency $f_0$ of a cell to which the physical channel is assigned.

The processors 102 and 202 in FIG. 1B may be configured to perform encoding, schrambling, modulation, layer mapping, transform precoding (for UL), subcarrier mapping, and OFDM modulation. The processors 102 and 202 may control the transceivers 106 and 206 connected to the processors 102 and 202 to up-convert the OFDM baseband signal onto the carrier frequency to generate radio frequency (RF) signals. The radio frequency signals are transmitted through antennas 108 and 208 to an external device.

FIG. 20(b) illustrates an example of physical layer processing at a receiving side.

The physical layer processing at the receiving side is basically the inverse processing of the physical layer processing at the transmitting side.

Frequency Down-Conversion

The communication device at a receiving side receives RF signals at a carrier frequency through antennas. The transceivers 106 and 206 receiving the RF signals at the carrier frequency down-converts the carrier frequency of the RF signals into the baseband in order to obtain OFDM baseband signals.

OFDM Demodulation

The communication device at the receiving side obtains complex-valued modulation symbols via CP detachment and FFT. For example, for each OFDM symbol, the communication device at the receiving side removes a CP from the OFDM baseband signals and performs FFT on the CP-removed OFDM baseband signals to obtain complex-valued modulation symbols for antenna port p, subcarrier spacing u and OFDM symbol 1.

Subcarrier Demapping

The subcarrier demapping is performed on the complex-valued modulation symbols to obtain complex-valued modulation symbols of a corresponding physical channel. For example, the processor(s) 102 may obtain complex-valued modulation symbols mapped to subcarriers belong to PDSCH from among complex-valued modulation symbols received in a bandwidth part. For another example, the processor(s) 202 may obtain complex-valued modulation symbols mapped to subcarriers belong to PUSCH from among complex-valued modulation symbols received in a bandwidth part.

Transform De-Precoding

Transform de-precoding (e.g. IDFT) is performed on the complex-valued modulation symbols of the uplink physical channel if the transform precoding has been enabled for the uplink physical channel. For the downlink physical channel and for the uplink physical channel for which the transform precoding has been disabled, the transform de-precoding is not performed.

Layer Demapping.

The complex-valued modulation symbols are de-mapped into one or two codewords.

Demodulation and Descrambling

The complex-valued modulation symbols of a codeword are demodulated and descrambled into bits of the codeword.

Decoding

The codeword is decoded into a transport block. For UL-SCH and DL-SCH, either LDPC base graph 1 or 2 is selected based on the size of the transport block and coding rate R. The codeword may include one or multiple coded blocks. Each coded block is decoded with the selected LDPC base graph into a CRC-attached code block or CRC-attached transport block. If code block segmentation was performed on a CRC-attached transport block at the transmitting side, a CRC sequence is removed from each of CRC-attached code blocks, whereby code blocks are obtained. The code blocks are concatenated into a CRC-attached transport block. The transport block CRC sequence is removed from the CRC-attached transport block, whereby the transport block is obtained. The transport block is delivered to the MAC layer.

In the above described physical layer processing at the transmitting and receiving sides, the time and frequency domain resources (e.g. OFDM symbol, subcarriers, carrier frequency) related to subcarrier mapping, OFDM modulation and frequency up/down conversion can be determined based on the resource allocation (e.g., UL grant, DL assignment).

For uplink data transmission, the processor(s) 102 of the present disclosure may apply (or control the transceiver(s) 106 to apply) the above described physical layer processing of the transmitting side to UL data/signal (e.g. MAC PDU) of the present disclosure to transmit the UL data/signal wirelessly. For uplink data reception, the processor(s) 102 of the present disclosure may apply (or control the transceiver(s) 106 to apply) the above described physical layer processing of the receiving side to received radio signals to obtain the UL data/signal of the present disclosure.

For downlink data transmission, the processor(s) 202 of the present disclosure may apply (or control the transceiver(s) 206 to apply) the above described physical layer processing of the transmitting side to DL data/signal (e.g. MAC PDU) of the present disclosure to transmit the DL data/signal wirelessly. For downlink data reception, the processor(s) 202 of the present disclosure may apply (or control the transceiver(s) 206 to apply) the above described physical layer processing of the receiving side to received radio signals to obtain DL data/signal of the present disclosure.

The processor(s) 102 may apply the above described physical layer processing of the transmitting side to the UL payload of the MsgA to transmit the UL payload of the MsgA message wirelessly. The processor(s) 202 may apply the above described physical layer processing of the receiving side to received radio signals to obtain the UL payload of the MsgA transmitted by the first device.

The processor(s) 202 may apply the above described physical layer processing of the transmitting side to an RAR MAC PDU to transmit the RAR MAC PDU wirelessly. The processor(s) 102 may apply the above described physical layer processing of the receiving side to received radio signals to obtain the RAR MAC PDU transmitted by the second device.

In some implementations of the present disclosure, an RAP is transmitted in a preamble format. A preamble format for a RA procedure of the present disclosure may consist of a cyclic prefix (CP) and a sequence part in a time domain, or consist of a CP part, a sequence part and a guard period (GP) in the time domain. In a GP of a preamble format, no signal is transmitted by a UE. The processor(s) 102 of the first device 100 may be configured to perform the OFDM modulation and the up-conversion to the RAP. For example, the processor(s) 102 at the UE side generates a time-continuous OFDM baseband signal on antenna port p for PRACH by adding a cyclic prefix (CP) and performing IFFT. For example, the processor(s) 102 of the first device may perform inverse fast Fourier transform (IFFT) on a preamble part containing the RAP and add a CP to the IFFT-ed signal to generate the OFDM baseband signal for the PRACH. The processor(s) 102 controls the transceiver(s) 106 to up-convert the OFDM baseband signal for antenna port p for PRACH to a carrier frequency $f_0$ of a cell via which the RAP is transmitted.

The processor(s) 202 of the second device may be configured to control the transceiver(s) 206 to down-convert the RF signals received at a carrier frequency in a PRACH occasion (e.g. time-frequency resource for PRACH) in the baseband signal in order to obtain OFDM baseband signals for PRACH. The processor(s) 202 may obtain an RAP via CP detachment and FFT. For example, processor(s) 202 of the second device removes a CP from the OFDM baseband signals for PRACH and performs FFT on the CP-removed OFDM baseband signals to obtain the RAP for antenna port p for PRACH. If the processor(s) 202 obtains both an RAP in an MsgA of a first device 100 and a payload in the MsgA successfully, the processor(s) 202 may generate an RAR MAC PDU containing a RAP ID for the RAP, and control the transceiver(s) 206 to transmit the RAR MAC PDU during a RAR window for the first device 100.

According to some implementations of the present disclosure, a UE can recognize the success/failure of the msgA transmission upon the expiry of the RAR window timer, whereby the UE delay of the RACH retry can be reduced and the 2-step RACH can be completed more quickly.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for performing a random access procedure by a transmitting device in a wireless communication system, the method comprising:
    transmitting a first message comprising i) a first random access preamble (RAP) with a first random access preamble identifier (RAPID), ii) a length field representing the number of RAPIDs related to the first field, and iii) a first uplink payload;
    receiving a random access response (RAR) medium access control (MAC) protocol data unit (PDU) including i) a first field set to represent presence of one or more RAPIDs and ii) the one or more RAPIDs;
    determining whether both of the first RAP and the first payload is successfully transmitted, based on whether the one or more RAPIDs include the first RAPID; and
    monitoring a second message related to the first message based on determining that both of the first RAP and the first payload is successfully transmitted.

2. The method according to claim 1, wherein the transmitting device determines that both of the first RAP and the first payload is successfully transmitted, based on the one or more RAPIDs including the first RAPID.

3. The method according to claim 1,
    wherein the first field represents presence or absence of the one or more RAPIDs, and
    wherein each of the one or more RAPIDs represents that a corresponding RAP and a payload transmitted with the corresponding RAP are both transmitted successfully.

4. The method according to claim 1, further comprising:
    retrying the random access procedure based on determining that at least one of the first RAP and the first payload is not successfully transmitted,
    wherein the transmitting device determines that at least one of the first RAP and the first payload is not successfully transmitted, based on the one or more RAPIDs not including the first RAPID.

5. The method according to claim 1,
    wherein the RAR MAC PDU includes a second field,
    wherein the second field represents whether the second field is followed by the first field.

6. The method according to claim 5,
    wherein the second field represents whether the second field is followed by the first field or followed by an RAPID field.

7. A transmitting device of performing a random access procedure by a transmitting device in a wireless communication system, the transmitting device comprising:
    at least one transceiver;
    at least one processor; and
    at least one computer memory storing instructions which, when executed, cause the at least one processor to perform operations comprising:
    transmitting a first message comprising i) a first random access preamble (RAP) with a first random access preamble identifier (RAPID), ii) a length field representing the number of RAPIDs related to the first field, and iii) a first uplink payload;
    receiving a random access response (RAR) medium access control (MAC) protocol data unit (PDU) including i) a first field set to represent presence of one or more RAPIDs and ii) the one or more RAPIDs;
    determining whether both of the first RAP and the first payload is successfully transmitted, based on whether the one or more RAPIDs include the first RAPID; and
    monitoring a second message related to the first message based on determining that both of the first RAP and the first payload is successfully transmitted.

8. The transmitting device according to claim 7, wherein determining whether both of the first RAP and the first payload is successfully transmitted comprises:
    determining that both of the first RAP and the first payload is successfully transmitted, based on the one or more RAPIDs including the first RAPID.

9. The transmitting device according to claim 7,
    wherein the first field represents presence or absence of the one or more RAPIDs, and
    wherein each of the one or more RAPIDs represents that a corresponding RAP and a payload transmitted with the corresponding RAP are both transmitted successfully.

10. The transmitting device according to claim 7, wherein the operations further comprise:
    retrying the random access procedure based on determining that at least one of the first RAP and the first payload is not successfully transmitted, wherein determining whether both of the first RAP and the first payload is successfully transmitted comprises:
determining that at least one of the first RAP and the first payload is not successfully transmitted, based on the one or more RAPIDs not including the first RAPID.

11. The transmitting device according to claim 7,
wherein the RAR MAC PDU includes a second field,
wherein the second field represents whether the second field is followed by the first field.

12. The transmitting device according to claim 11,
wherein the second field represents whether the second field is followed by the first field or followed by an RAPID field.

13. An apparatus for a transmitting device, the apparatus comprising:
at least one processor; and
at least one computer memory storing instructions which, when executed, cause the at least one processor to perform operations comprising:
transmitting a first message comprising i) a first random access preamble (RAP) with a first random access preamble identifier (RAPID), ii) a length field representing the number of RAPIDs related to the first field, and iii) a first uplink payload;
receiving a random access response (RAR) medium access control (MAC) protocol data unit (PDU) including i) a first field set to represent presence of one or more RAPIDs and ii) the one or more RAPIDs;
determining whether both of the first RAP and the first payload is successfully transmitted, based on whether the one or more RAPIDs include the first RAPID; and
monitoring a second message related to the first message based on determining that both of the first RAP and the first payload is successfully transmitted.

14. A non-transitory computer readable storage medium storing at least one program that include instructions which, when executed, cause the at least one processor to perform operations comprising:
transmitting a first message comprising i) a first random access preamble (RAP) with a first random access preamble identifier (RAPID), ii) a length field representing the number of RAPIDs related to the first field, and iii) a first uplink payload;
receiving a random access response (RAR) medium access control (MAC) protocol data unit (PDU) including i) a first field set to represent presence of one or more RAPIDs and ii) the one or more RAPIDs;
determining whether both of the first RAP and the first payload is successfully transmitted, based on whether the one or more RAPIDs include the first RAPID; and
monitoring a second message related to the first message based on determining that both of the first RAP and the first payload is successfully transmitted.

* * * * *